US012505970B2

(12) United States Patent
Pilato et al.

(10) Patent No.: US 12,505,970 B2
(45) Date of Patent: Dec. 23, 2025

(54) CIRCUIT BREAKER INCLUDING A REMOTE ON/OFF BREAKER

(71) Applicant: LEVITON MANUFACTURING CO., INC., Melville, NY (US)

(72) Inventors: Nicholas Pilato, Melville, NY (US); Stephen Aaron, Melville, NY (US); Michael Kamor, Melville, NY (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 206 days.

(21) Appl. No.: 18/277,260

(22) PCT Filed: Feb. 4, 2022

(86) PCT No.: PCT/US2022/015201
§ 371 (c)(1),
(2) Date: Aug. 15, 2023

(87) PCT Pub. No.: WO2022/177757
PCT Pub. Date: Aug. 25, 2022

(65) Prior Publication Data
US 2024/0128040 A1 Apr. 18, 2024

Related U.S. Application Data

(60) Provisional application No. 63/151,360, filed on Feb. 19, 2021.

(51) Int. Cl.
*H01H 71/10* (2006.01)
*H01H 9/16* (2006.01)
(Continued)

(52) U.S. Cl.
CPC ........ *H01H 71/1027* (2013.01); *H01H 9/167* (2013.01); *H01H 9/168* (2013.01); *H01H 9/26* (2013.01); *H01H 71/52* (2013.01)

(58) Field of Classification Search
CPC .... H01H 71/1027; H01H 9/167; H01H 9/168; H01H 9/26; H01H 71/52; H01H 71/10; H01H 9/16
(Continued)

(56) References Cited

U.S. PATENT DOCUMENTS 3,113,245 A 12/1963 Hoffman
3,786,311 A 1/1974 Hobson, Jr. et al.
(Continued)

FOREIGN PATENT DOCUMENTS

CN 204332850 U 5/2015
CN 204760342 U 11/2015
(Continued)

OTHER PUBLICATIONS

International Preliminary Report on Patentability issued by the International Bureau of WIPO in connection with International Application No. PCT/US2022/015201, dated Aug. 22, 2023.
(Continued)

*Primary Examiner* — Anthony R Jimenez
(74) *Attorney, Agent, or Firm* — George Likourezos; Carter, DeLuca & Farrell LLP

(57) ABSTRACT

A circuit breaker is configured to be remotely caused to enter ON and OFF states. A lever arm is pivotably coupled to a main contact spring. A contact is supported at the distal end portion of the lever arm. Pivoting of the lever arm to bring the contact into contact with another contact on the housing causes the circuit breaker to enter the ON state. Pivoting of the lever arm to separate the contacts causes the circuit breaker to enter the OFF state. A latching solenoid includes a plunger coupled to the lever arm. The latching solenoid moves the plunger between a retracted configuration and an extended configuration. When in the extended position, the
(Continued)

lever arm is pivoted to separate the contacts to cause the circuit breaker to enter the OFF state.

30 Claims, 17 Drawing Sheets

(51) Int. Cl.
*H01H 9/26* (2006.01)
*H01H 71/52* (2006.01)

(58) Field of Classification Search
USPC .......................................................... 200/308
See application file for complete search history.

(56) References Cited

U.S. PATENT DOCUMENTS

| | | | |
|---|---|---|---|
| 3,840,783 | A | 10/1974 | Eckart |
| 3,949,272 | A | 4/1976 | Smith |
| 4,091,433 | A | 5/1978 | Wilkinson |
| 4,329,727 | A | 5/1982 | Premeriani |
| 4,521,824 | A | 6/1985 | Morris et al. |
| 4,595,894 | A | 6/1986 | Doyle et al. |
| 4,631,625 | A | 12/1986 | Alexander et al. |
| 4,641,217 | A | 2/1987 | Morris et al. |
| 4,814,712 | A | 3/1989 | Burton et al. |
| 5,414,395 | A | 5/1995 | Garnto et al. |
| 5,453,723 | A | 9/1995 | Fello et al. |
| 5,477,201 | A | 12/1995 | Garnto et al. |
| 5,481,235 | A | 1/1996 | Heise |
| 5,483,211 | A | 1/1996 | Carrodus et al. |
| 5,510,945 | A | 4/1996 | Taylor et al. |
| 5,889,643 | A | 3/1999 | Elms |
| 5,933,063 | A | 8/1999 | Keung et al. |
| 5,940,257 | A | 8/1999 | Zavis |
| 6,014,297 | A | 1/2000 | Clarey et al. |
| 6,040,967 | A | 3/2000 | DiSalvo |
| 6,052,046 | A | 4/2000 | Ennis et al. |
| 6,288,882 | B1 | 9/2001 | Disalvo et al. |
| 6,417,671 | B1 | 7/2002 | Tiemann |
| 6,538,862 | B1 | 3/2003 | Mason, Jr. et al. |
| 6,734,768 | B2 | 5/2004 | Kim |
| 6,864,447 | B1 | 3/2005 | Lipsey, II |
| 6,897,747 | B2 | 5/2005 | Brandon |
| 6,961,226 | B2 | 11/2005 | Mason, Jr. et al. |
| 7,019,606 | B2 | 3/2006 | Williams et al. |
| 7,061,349 | B2 | 6/2006 | Castonguay et al. |
| 7,161,780 | B2 | 1/2007 | Germain et al. |
| 7,298,606 | B2 | 11/2007 | M'Sadoques |
| 7,307,429 | B1 | 12/2007 | Parker et al. |
| 7,342,474 | B2 | 3/2008 | Castonguay et al. |
| 7,378,927 | B2 | 5/2008 | DiSalvo et al. |
| 7,414,499 | B2 | 8/2008 | Germain |
| 7,595,710 | B2 | 9/2009 | DeBoer et al. |
| 7,598,629 | B2 | 10/2009 | Brown et al. |
| 7,876,181 | B2 | 1/2011 | Nakano |
| 8,120,886 | B2 | 2/2012 | Anand et al. |
| 8,368,489 | B2 * | 2/2013 | Sohn ...................... H01H 83/20 335/78 |
| 8,437,112 | B2 | 5/2013 | Wan et al. |
| 8,451,568 | B2 | 5/2013 | Wan et al. |
| 8,570,713 | B2 | 10/2013 | Kumfer et al. |
| 9,042,073 | B2 | 5/2015 | Mills et al. |
| 9,048,054 | B2 | 6/2015 | Potratz |
| 9,312,088 | B2 | 4/2016 | Sorenson, Sr. |
| 9,318,284 | B2 | 4/2016 | Fasano |
| 9,324,513 | B2 | 4/2016 | Cazals |
| 9,384,931 | B2 | 7/2016 | Fasano |
| 9,799,476 | B2 | 10/2017 | Fasano |
| 9,859,084 | B2 * | 1/2018 | Fasano .................. H01H 71/32 |
| 9,966,206 | B1 | 5/2018 | Sastry et al. |
| 10,361,043 | B2 | 7/2019 | Okerman |
| 10,651,681 | B2 | 5/2020 | Sorenson |
| 10,855,067 | B2 | 12/2020 | Murahari et al. |
| 11,342,152 | B2 | 5/2022 | Ostrovsky |
| 11,398,363 | B2 | 7/2022 | Courson et al. |
| 11,818,582 | B2 * | 11/2023 | Kevelos ............... H02H 1/0092 |
| 11,901,148 | B2 | 2/2024 | Kamor et al. |
| 2003/0123209 | A1 | 7/2003 | Kim |
| 2005/0024173 | A1 | 2/2005 | Puskar et al. |
| 2005/0212628 | A1 | 9/2005 | Castonguay et al. |
| 2005/0212629 | A1 | 9/2005 | Williams et al. |
| 2005/0213289 | A1 | 9/2005 | M'Sadoques et al. |
| 2006/0071742 | A1 | 4/2006 | Castonguay et al. |
| 2007/0132531 | A1 | 6/2007 | Elms |
| 2008/0151463 | A1 | 6/2008 | Dwyer et al. |
| 2009/0167100 | A1 | 7/2009 | Brown et al. |
| 2010/0020453 | A1 | 1/2010 | Mccoy et al. |
| 2010/0052829 | A1 | 3/2010 | Anand et al. |
| 2011/0273817 | A1 | 11/2011 | Wan |
| 2011/0273818 | A1 | 11/2011 | Wan et al. |
| 2012/0273334 | A1 | 11/2012 | Ganley |
| 2013/0003262 | A1 | 1/2013 | Kumfer et al. |
| 2014/0062623 | A1 | 3/2014 | Fasano |
| 2014/0176293 | A1 | 6/2014 | Melecio |
| 2015/0035628 | A1 | 2/2015 | Warne |
| 2015/0070114 | A1 | 3/2015 | Fasano et al. |
| 2015/0101914 | A1 | 4/2015 | Sorenson |
| 2016/0141862 | A1 | 5/2016 | Endozo et al. |
| 2016/0163475 | A1 | 6/2016 | Okerman |
| 2016/0300682 | A1 | 10/2016 | Fasano |
| 2019/0058354 | A1 | 2/2019 | Sorenson |
| 2019/0189379 | A1 | 6/2019 | Ostrovsky et al. |
| 2020/0136365 | A1 | 4/2020 | Courson |

FOREIGN PATENT DOCUMENTS

| | | | |
|---|---|---|---|
| EP | 1703533 | A2 | 9/2006 |
| EP | 2849200 | A1 | 3/2015 |
| WO | 02080329 | A1 | 10/2002 |
| WO | 2004044937 | A2 | 5/2004 |
| WO | 2008010038 | A2 | 1/2008 |

OTHER PUBLICATIONS

International Search Report issued in corresponding International Application No. PCT/US2022/015201, dated Jul. 11, 2022, pp. 1-3.
Written Opinion issued in corresponding International Application No. PCT/US2022/015201, dated Jul. 11, 2022, pp. 1-7.

* cited by examiner

CIRCUIT BREAKER INCLUDING A REMOTE ON/OFF BREAKER

CROSS REFERENCE TO RELATED APPLICATIONS

The present application is a national stage application of International Application No. PCT/US2022/015201, filed Feb. 4, 2022, which claims the benefit of and priority to U.S. Patent Provisional Application No. 63/151,360 filed on Feb. 19, 2021. The entire disclosure of the foregoing application is incorporated by reference herein.

TECHNICAL FIELD

The present disclosure relates to a circuit breaker and, more particularly, to a circuit breaker including a remote ON/OFF breaker.

BACKGROUND

A circuit breaker is an electrical switch that may be automatically operated to protect an electrical circuit from damage. For example, damage may be caused by excess current from an overload or short circuit. A basic function of a circuit breaker is to interrupt a flow of current when a fault occurs. Similarly to a fuse, which generally operates as a single use device and therefore must be replaced, a circuit breaker can be reset to resume normal operation. For example, a conventional circuit breaker can be reset either manually or automatically.

SUMMARY

Embodiments of the present disclosure are described in detail with reference to the drawing figures wherein like reference numerals identify similar or identical elements.

According to an aspect of the present disclosure, a remotely operated circuit breaker includes a housing and a first circuit interrupter supported in the housing. The first circuit interrupter is configured to be remotely switched between a closed configuration in which the first circuit interrupter is in an ON state and an open configuration in which the first circuit interrupter is in an OFF state. A main contact spring is supported in the housing. A lever arm is pivotably coupled to a main contact spring. A first contact is supported by the housing. A second contact is supported at the distal end portion of the lever arm. Pivoting of the lever arm to bring the second contact into contact with the first contact to cause the first circuit interrupter to enter the ON state. Pivoting of the lever arm to separate the second contact from the first contact causes the first circuit interrupter to enter the OFF state. A latching solenoid defines a plunger operably coupled to the proximal end portion of the lever arm. The latching solenoid moves the plunger between a retracted configuration and an extended configuration. When in the extended configuration, the lever arm is pivoted by the plunger to separate the second contact from the first contact to cause the first circuit interrupter to enter the OFF state.

In an aspect of the present disclosure, the latching solenoid is configured to be toggled between a latched configuration in which the plunger is in the extended configuration and an unlatched configuration in which the plunger is in the retracted configuration. A wireless communication circuit is in electrical communication with the latching solenoid. The wireless communication circuit is configured to receive a wireless signal from a remote entity for the latching solenoid to toggle between the latched configuration and the unlatched configuration.

In an aspect of the present disclosure, a controller (e.g., a computer) includes a processor and a memory. The controller is in electrical communication with the latching solenoid. The wireless communication circuit is housed in the controller. The controller is configured to control the latching solenoid to toggle between the latched configuration and the unlatched configuration.

In an aspect of the present disclosure, the wireless communication circuit is configured to wirelessly connect an electronic device via one or more of a personal area network, a wireless local area network, or a cellular network connection, and wherein the electronic device is configured to deliver a wireless signal instruction that the latching solenoid is to be toggled to the latched configuration or the unlatched configuration. The electronic device may be a smartphone, a tablet computer, a laptop computer, or a desktop computer.

In an aspect of the present disclosure, the circuit breaker is a thermal breaker, a thermal-magnetic breaker, a hydraulic-magnetic breaker, a magnetic breaker, or a hydraulic breaker.

In an aspect of the present disclosure, the circuit breaker is a two-pole breaker or a three-pole breaker.

In an aspect of the present disclosure, a contact arm is supported at the distal end portion of the lever arm. The second contact is disposed on the contact arm to face the first contact supported by the housing.

In an aspect of the present disclosure, a coupling arm is supported at a distal end of the plunger. The coupling arm is operably coupled to the proximal end portion of the lever arm.

In an aspect of the present disclosure, the latching solenoid includes a bobbin and a magnet. The pole piece extends from the magnet. A core is operably coupled to the plunger. The core is slidably disposed in the bobbin. The core is configured to slide between a latched configuration in which the core is in contact with the pole piece and the first circuit interrupter is in the OFF state and an unlatched configuration in which the core is spaced apart from the pole piece and the first circuit interrupter is in the ON state.

In an aspect of the present disclosure, a biasing member extends between the core and the pole piece. The biasing member biases the core toward the unlatched configuration in which the core is spaced apart from the pole piece.

In an aspect of the present disclosure, an electrical current is passed through the coil in a first direction to generate a magnetic field in the core. An electrical current is passed through the coil in a second direction opposite the first direction to reverse the magnetic field in the core.

According to an aspect of the present disclosure, an assembly for remotely operating a circuit breaker includes a lever arm configured to be remotely pivoted between a first position in which a circuit breaker is in an ON state and a second position in which the circuit breaker to an OFF state. A latching solenoid includes a plunger operably coupled to the lever arm. The latching solenoid is configured to move the plunger between a retracted configuration and an extended configuration in which the lever arm is pivoted by the plunger to bring the lever arm to the second position. A wireless communication circuit is in electrical communication with the latching solenoid. The wireless communication circuit is configured to receive a wireless signal from a remote entity for moving the plunger between the retracted configuration and the extended configuration.

In an aspect of the present disclosure, an electrical reset assembly is configured to move the plunger of the latching solenoid from the extended configuration to the retracted configuration by passing an electrical current through the latching solenoid.

In an aspect of the present disclosure, a mechanical reset assembly is configured to move the plunger of the latching solenoid from the extended configuration to the retracted configuration by applying a mechanical force to the plunger by a rocker.

In an aspect of the present disclosure, the mechanical reset assembly includes a reset blade defined by the plunger of the latching solenoid and a reset notch defined in the rocker. The reset notch is configured to mechanically interact with the reset blade to move the plunger from the extended configuration to the retracted configuration.

In an aspect of the present disclosure, the mechanical reset assembly includes a stop notch defined in the rocker. The stop notch is configured to engage the reset blade to prevent the plunger from moving from the retracted configuration to the extended configuration.

In an aspect of the present disclosure, the mechanical reset assembly includes a stabilization blade defined by the plunger. The stabilization blade is configured to engage a groove of the circuit breaker to guide a longitudinal path of the plunger.

In an aspect of the present disclosure, an indicator switch is supported in the housing. The plunger defines a notch configured to engage the indicator switch when the plunger is in the extended configuration. Engaging the indicator switch by the plunger activates an indicator (e.g., an LED light) communicating that the circuit breaker is in the remote OFF state.

In an aspect of the present disclosure, the indicator switch includes a fixed pin and a spring supported in the housing. The spring includes an arm biased toward the pin. The arm of the spring is in contact with the pin when the plunger is in the retracted configuration. The arm of the spring is separated from the pin by engaging the arm of the spring in the notch of the plunger and applying mechanical pressure to separate the arm of the spring from the pin when the plunger is moved to the extended configuration.

According to an aspect of the present disclosure, an assembly for remotely operating a two-pole circuit breaker includes a first lever arm configured to be remotely pivoted between a first position in which a first breaker pole is in an ON state and a second position to toggle the first breaker pole to an OFF state. A first latching solenoid includes a first plunger operably coupled to the first lever arm. The first latching solenoid is configured to move the first plunger between a retracted configuration and an extended configuration in which the first lever arm is pivoted by the first plunger to bring the first lever arm from the first position to the second position. A second lever arm is configured to be remotely pivoted between a first position in which a second breaker pole is in an ON state and a second position to toggle the second breaker pole to an OFF state. A second latching solenoid includes a second plunger operably coupled to the second lever arm. The second latching solenoid is configured to move the second plunger between a retracted configuration and an extended configuration in which the second lever arm is pivoted by the second plunger to bring the second lever arm from the first position to the second position. A wireless communication circuit is in electrical communication with the first and second latching solenoids. The wireless communication circuit is configured to receive a wireless signal from a remote entity for moving the first and second plungers between the retracted configuration and the extended configuration.

In an aspect of the present disclosure, the first latching solenoid is arranged in-parallel with the second latching solenoid.

In an aspect of the present disclosure, the first plunger of the first latching solenoid is configured to be moved between the retracted configuration and the extended configuration substantially simultaneously with the second plunger of the second latching solenoid being moved between the retracted configuration and the extended configuration.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the present invention may be more readily understood by one skilled in the art with reference being had to the following detailed description of several embodiments thereof, taken in conjunction with the accompanying drawings wherein like elements are designated by identical reference numerals throughout the several views, and in which:

Figure 1:
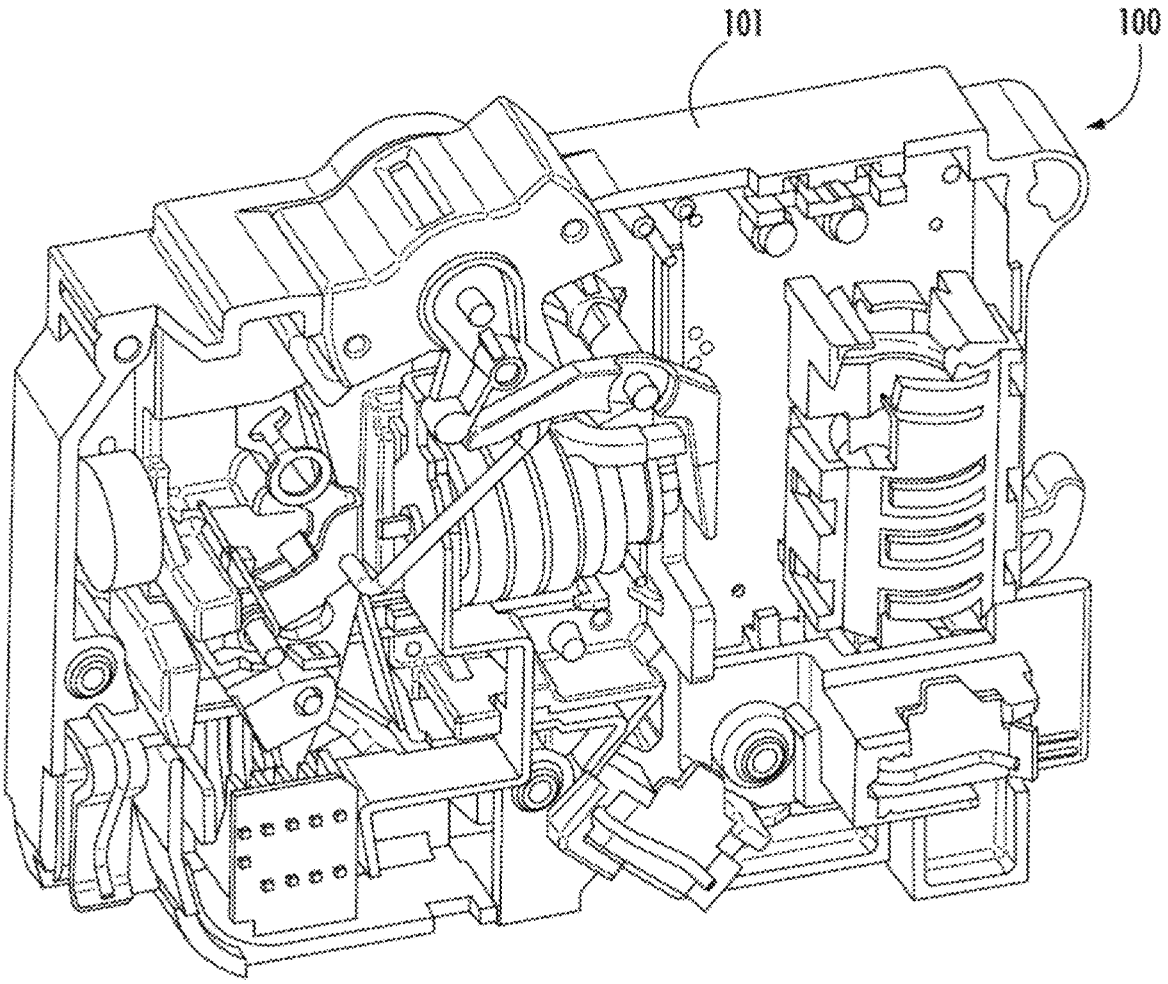
FIG. 1 is a perspective view showing internal components of a circuit breaker in accordance with aspects of the present disclosure.

The figures depict embodiments of the present disclosure for purposes of illustration only. One skilled in the art will readily recognize from the following description that alternative embodiments of the structures and methods illustrated herein may be employed without departing from the principles of the present disclosure described herein.

DETAILED DESCRIPTION

The present disclosure is directed to systems and methods for remotely switching ON and OFF a breaker remotely (i.e., without a user or operator being in physical contact or even being in the general vicinity of a circuit breaker). For example, according to the systems and methods described herein a thermal breaker, or other suitable type of breaker, can be remotely controlled through a wireless connection to an electronic device, such as a smartphone, tablet computer, laptop computer or desktop computer.

For the purposes of promoting an understanding of the principles of the present disclosure, reference will now be made to the exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

Descriptions of technical features or aspects of an exemplary embodiment of the present disclosure should typically be considered as available and applicable to other similar features or aspects in another exemplary embodiment of the present disclosure. Accordingly, technical features described herein according to one exemplary embodiment of the present disclosure may be applicable to other exemplary embodiments of the present disclosure, and thus duplicative descriptions may be omitted herein.

Exemplary embodiments of the present disclosure will be described more fully below (e.g., with reference to the accompanying drawings). Like reference numerals may refer to like elements throughout the specification and drawings.

The phrases "breaker" and "circuit breaker" may be used interchangeably herein. A circuit breaker is further described in U.S. patent application Ser. No. 16/707,535, filed on Dec. 9, 2019, the disclosure of which is incorporated by reference herein in its entirety.

Figure 2:
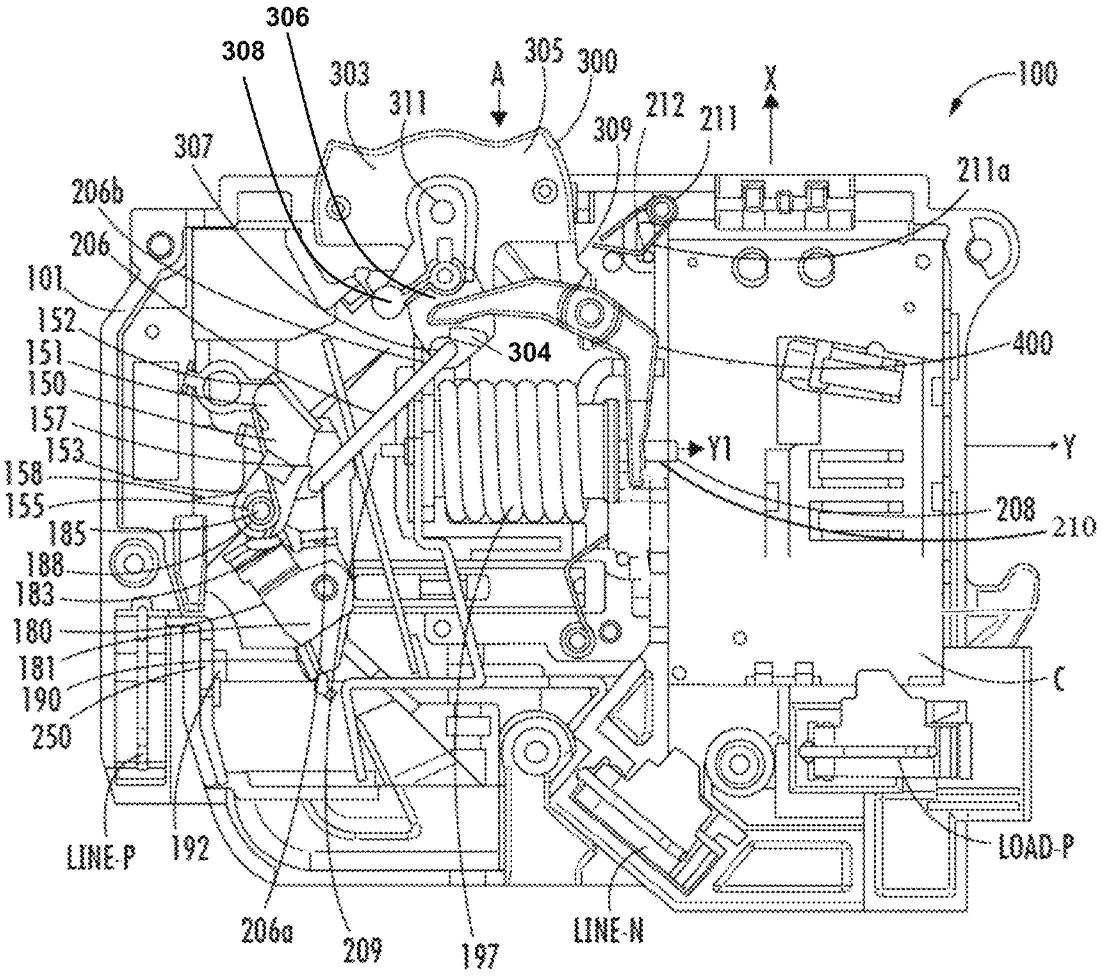
FIG. 2 is a side view of the internal components of the circuit breaker of FIG. 1.

Referring to FIGS. 1 and 2, a circuit breaker 100 of this disclosure generally includes a housing 101 and defines an axis "X" and an axis "Y" that are perpendicular to one another.

The circuit breaker 100 generally includes a rocker 300, an armature 400, a solenoid 197, a plunger 208, and a linkage 206. The rocker 300 is disposed partially within the housing 101 of the circuit breaker 100 and is positioned to transition between an OFF position, corresponding to the OFF state of the circuit breaker 100, and an ON position, corresponding to the ON state of the circuit breaker 100. When the circuit breaker 100 is in the OFF state, a line phase terminal "LINE-P" and line neutral terminal "LINE-N" are not in electrical communication with a load phase terminal "LOAD-P" and a load neutral terminal "LOAD-N," respectively (the load neutral terminal is not shown). For purposes of clarity, unless explicitly stated, the line phase terminal "LINE-P" and line neutral terminal "LINE-N" will collectively be referred to as a line terminals "LINE-T," and similarly the load phase terminal "LOAD-P" and load neutral terminal "LOAD-N" will collectively be referred to as a load terminals "LOAD-T." Thus, when the circuit breaker 100 is in the OFF state, the line terminal "LINE-T" and the load terminal "LOAD-T" are not in electrical communication. Alternatively, when the circuit breaker 100 is in an ON state, the line and load terminals "LINE-T," "LOAD-T" are mechanically coupled via the conductive path, enabling transmission of electrical power therebetween.

The rocker 300 partially extends outward through housing 101 of the circuit breaker 100 and is configured for user access for manually operating the circuit breaker 100. The rocker 300 is pivotably coupled to the housing 101 about a pivot pin 311.

The rocker 300 includes a body 306, a first side 303 and a second side 305. The first side 303 is associated with an OFF position of the rocker 300, and more generally, the OFF state of the circuit breaker 100. In other words, when the rocker 300 is rotated such that the first side 303 is depressed (e.g., the rocker is rotated counterclockwise), the rocker 300 is in the OFF position. The second side 305, is associated with an ON position of the rocker 300, and more generally, the ON state of the circuit breaker 100. The second side 305 of the rocker 300 includes a finger 309 configured to mechanically engage a switch spring 211. The switch spring 211 is engaged when going from OFF to ON to clear the reset lockout. The finger 309 is located towards the bottom of the second side 305 of the rocker 300.

The body 306 of the rocker 300 includes a strike arm 308, a lock nub 304, and a bottom extension 307. The strike arm 308 is configured to mechanically engage the armature 400 during a fault condition. The rocker 300 includes a surface that will move the plunger (e.g., plunger 506 described below) to an unlatched position when the rocker handle is moved from an ON position to an OFF position. Plunger 506 includes a corresponding set of geometry to interact with the rocker 300.

The lock nub 304 is configured to mechanically engage the armature 400 to prevent the rocker 300 from moving in a direction "A" before it is determined that the breaker is operational.

The finger 309 is operatively coupled to switch spring 211 during a portion of the travel of the rocker 300. Switch spring 211 is configured to make electrical contact with conductive member 212. The rocker bottom extension 307 is operatively coupled to a first end **206*b* of a linkage 206 having the first end 206*b* and a second end 206*a*. The linkage 206 is disposed in the housing 101 and is configured to enable the conductive path to move between an OPEN configuration and a CLOSED configuration for transitioning the circuit breaker 100** between the open and closed states.

As described in more detail below, when the circuit breaker 100 is in the OFF state, first and second contacts 190, 192 of a contact arm 180 are in an OPEN position (i.e., not physically touching). When the circuit breaker 100 is in the ON state, first and second contacts 190, 192 are in a CLOSED portion (i.e., are in direct physical contact with each other).

The solenoid 197 is configured to be energized by the controller "C." When energized, the solenoid 197 generates a magnetic field sufficient to move the plunger 208 along axis "Y1" defined by the plunger 208. The plunger 208 extends through the solenoid 197 and partially outward relative to both sides of the solenoid 197. The plunger 208 includes an elongated shaft having a distal portion 210 and a proximal portion 209. The proximal portion 209 of the plunger 208 is configured to function as a stop to catch 150. Solenoid 197 is configured for overcurrent/fault tripping (e.g., local operation) and the latching solenoid 505 described herein is configured for remote tripping.

The contact arm 180 includes a contact support section 181 and a pivot support section 183. Contact arm 180 is biased in a first position by a spring 188. The pivot support section 183 has an outer perimeter, a portion of which has a circular or substantially circular configuration, but may include any suitable geometric configuration. The pivot support section 183 further defines a slot (not shown) therethrough for receiving a pivot pin 185. The contact arm 180 includes the first contact 190 configured to directly physically contact the second contact 192 (when the breaker is in the ON state) attached to housing 101 (e.g., the first contact 190 is moveable and the second contact 192 is fixed, relative to the housing 101). When the first contact 190 and the second contact 192 are in direct contact with each other, electrical power may be conducted therebetween.

The circuit breaker 100 may include the catch 150 configured to mechanically engage with the linkage 206 and the contact arm 180. The catch 150 includes a proximal portion 151, a distal portion 153, and a plate 152. The distal portion 153 includes a first linkage portion 155 and a catch portion 157. Catch portion 157 may include a curved portion that protrudes outwardly from a surface of catch 150. Catch 150 is biased in a first position by a spring 158.

Referring to FIGS. 3-9, a circuit breaker 500 in housing 501 is generally described. The circuit breaker 500 operates as a circuit interrupter. The circuit breaker 500 is substantially the same as circuit breaker 100 described herein, unless otherwise indicated. Thus, duplicative descriptions will be omitted.

The circuit breaker 500 is configured to be remotely switched between a closed configuration (see, e.g., FIGS. 3-4) in which the circuit breaker 500 is in an ON state and an open configuration (see, e.g., FIGS. 5-6) in which the circuit breaker 500 is in an OFF state. A lever arm 502 is pivotably coupled to a main contact spring 588. The main contact spring 588 biases the lever arm 502 to maintain the circuit breaker 500 in the ON state. A first contact 503 is supported by the housing 501. The lever arm 502 defines a proximal end portion 511 and a distal end portion 512. A second contact 504 is supported at the distal end portion 512 of the lever arm 502. The first and second contacts 503 and 504 are each electrical contacts that complete a circuit (e.g., a branch circuit) when the first and second contacts 503 and 504 are in electrical contact (e.g., in direct physical contact) with each other. Pivoting of the lever arm 502 to bring the second contact 504 into contact with the first contact 503 causes the circuit breaker 500 to enter the ON state (e.g., via the biasing action of the main contact spring 588 on lever arm 502). Pivoting of the lever arm 502 to separate the second contact 504 from the first contact 503 causes the circuit breaker 500 to enter the OFF state.

When the circuit breaker 500 is tripped off remotely, as described herein, the rocker (see, e.g., rocker 580) remains in the ON position, but an indicator (e.g., a light such as an LED) is activated to indicate this state.

A circuit interrupter, such as the latching solenoid 505 (or an electrically-held relay, or a solid state relay) includes a plunger 506 operably coupled to the proximal end portion 511 of the lever arm 502. The latching solenoid 505 moves the plunger 506 (e.g., along a longitudinal axis of the plunger 506) between a retracted configuration (see, e.g., FIGS. 3-4) in which the circuit breaker 500 is in the ON state and an extended configuration (see, e.g., FIGS. 5-6) in which the lever arm 502 is pivoted by the plunger 506 to separate the second contact 504 from the first contact 503 to switch the circuit breaker 500 to the OFF state.

Figure 3:
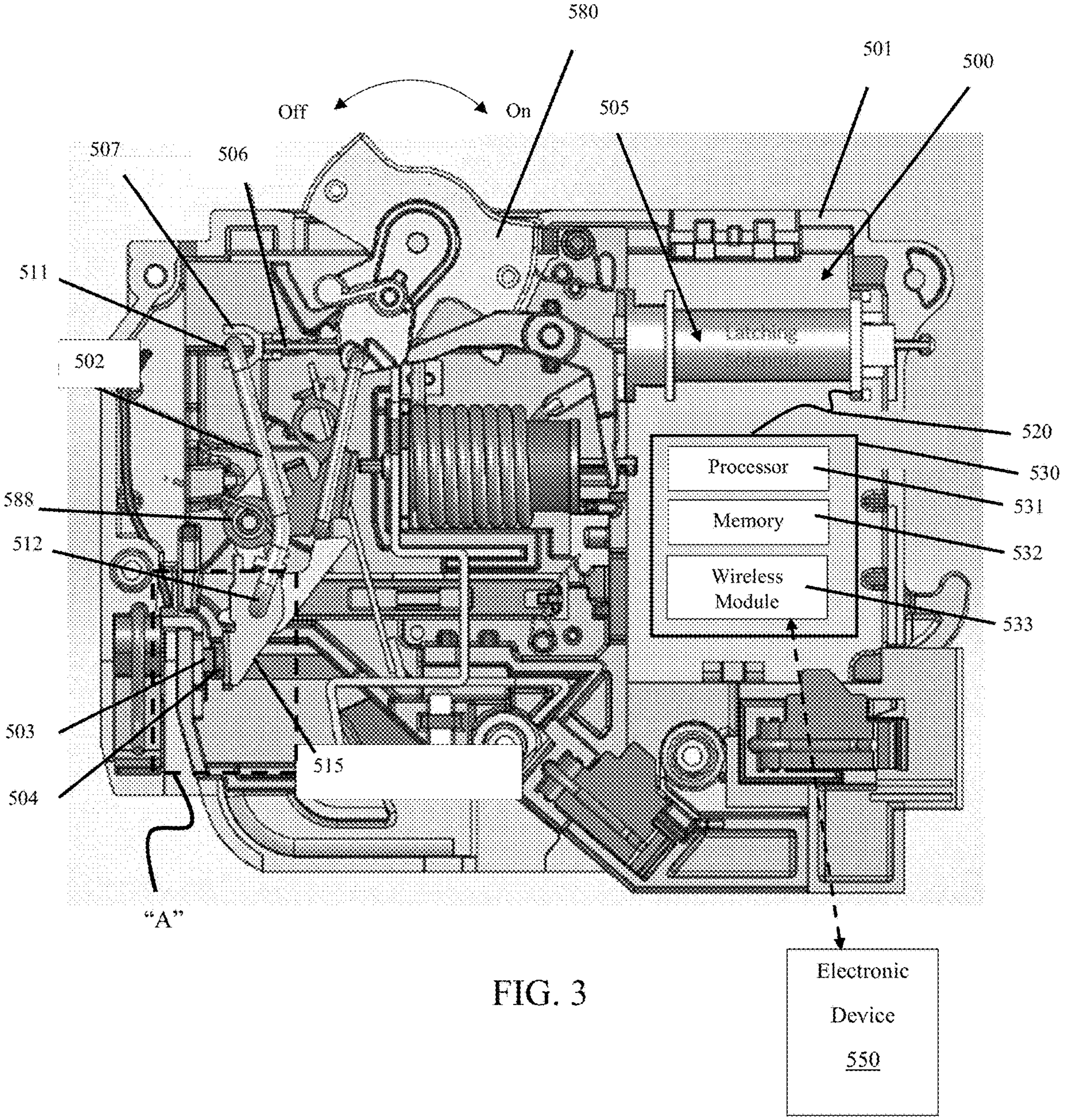
FIG. 3 is a side view showing internal components of a circuit breaker in an ON state in accordance with aspects of the present disclosure.
Figure 4:
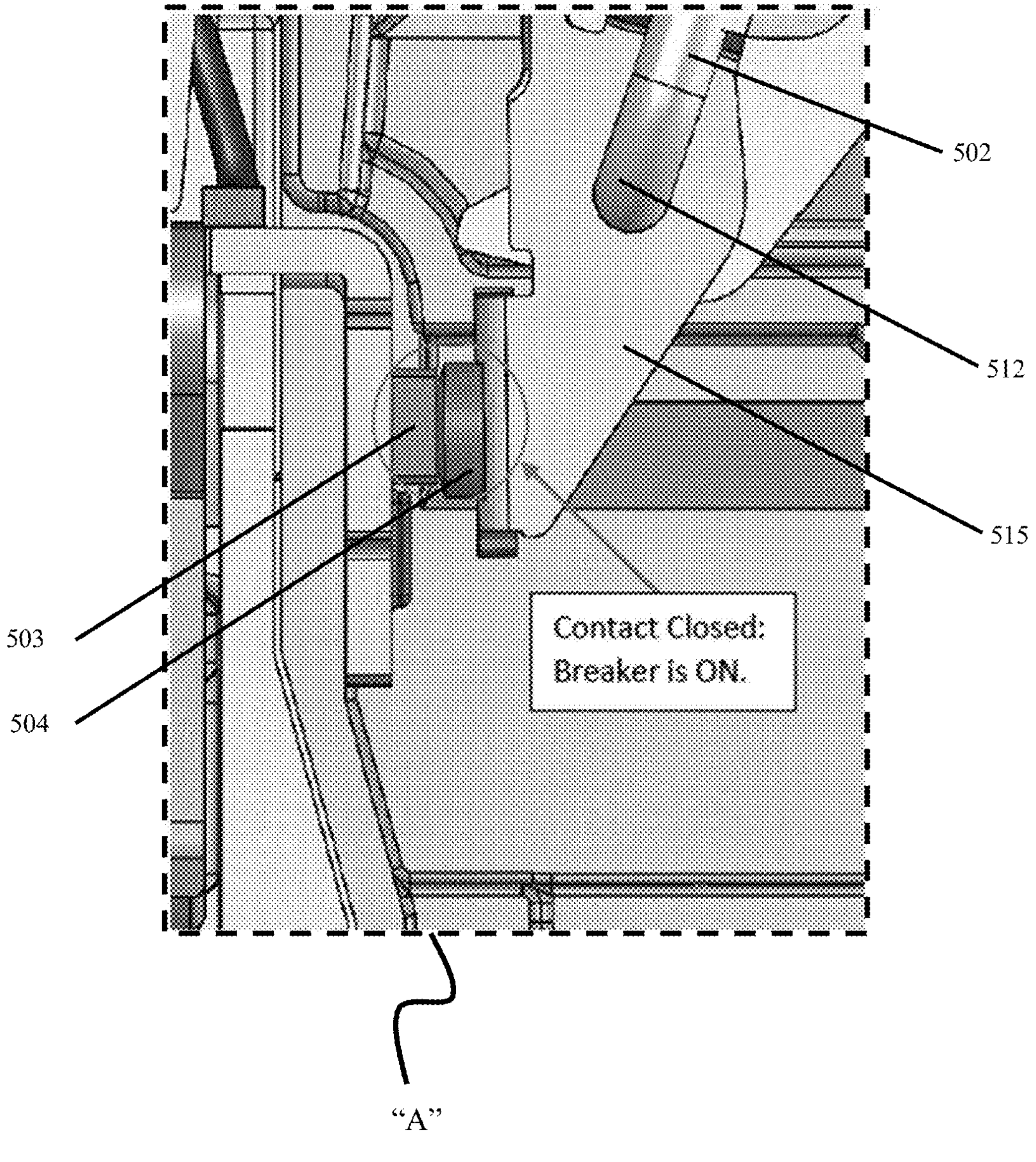
FIG. 4 is an enlarged, side view, of area "A" of FIG. 3.
Figure 5:
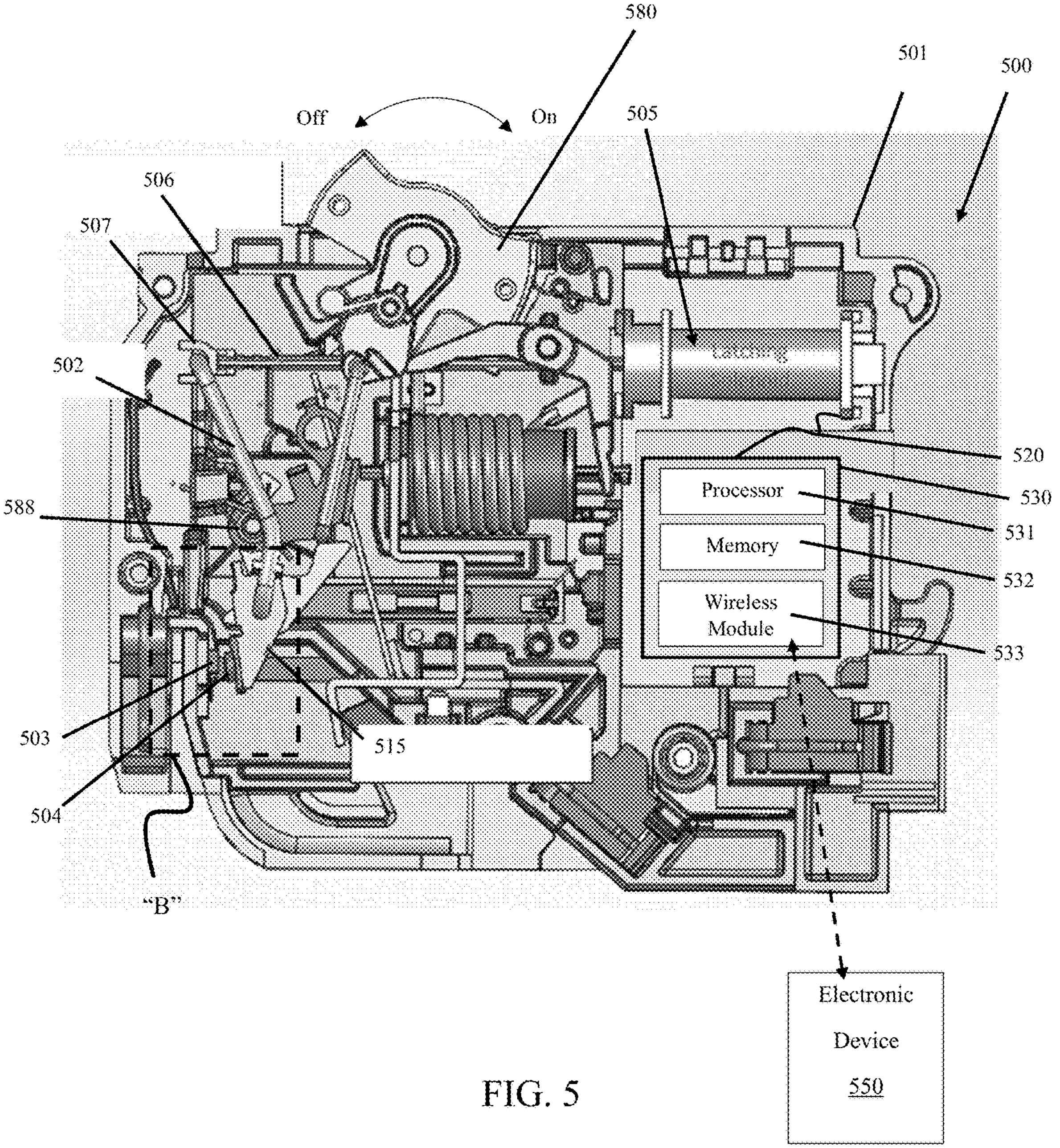
FIG. 5 is a side view of the circuit breaker of FIG. 3 in an OFF state.
Figure 6:
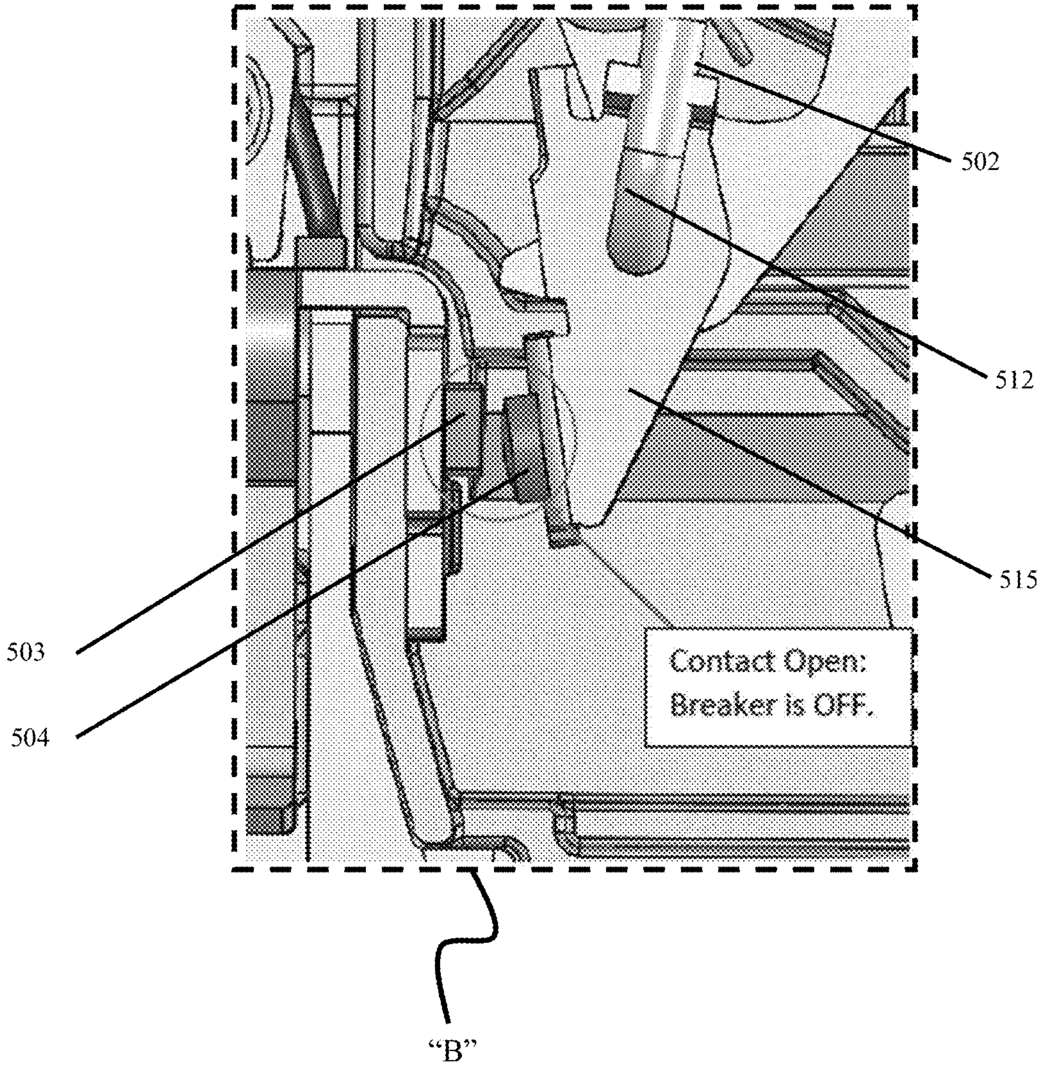
FIG. 6 is an enlarged, side view, of area "B" of FIG. 5.
Figure 9:
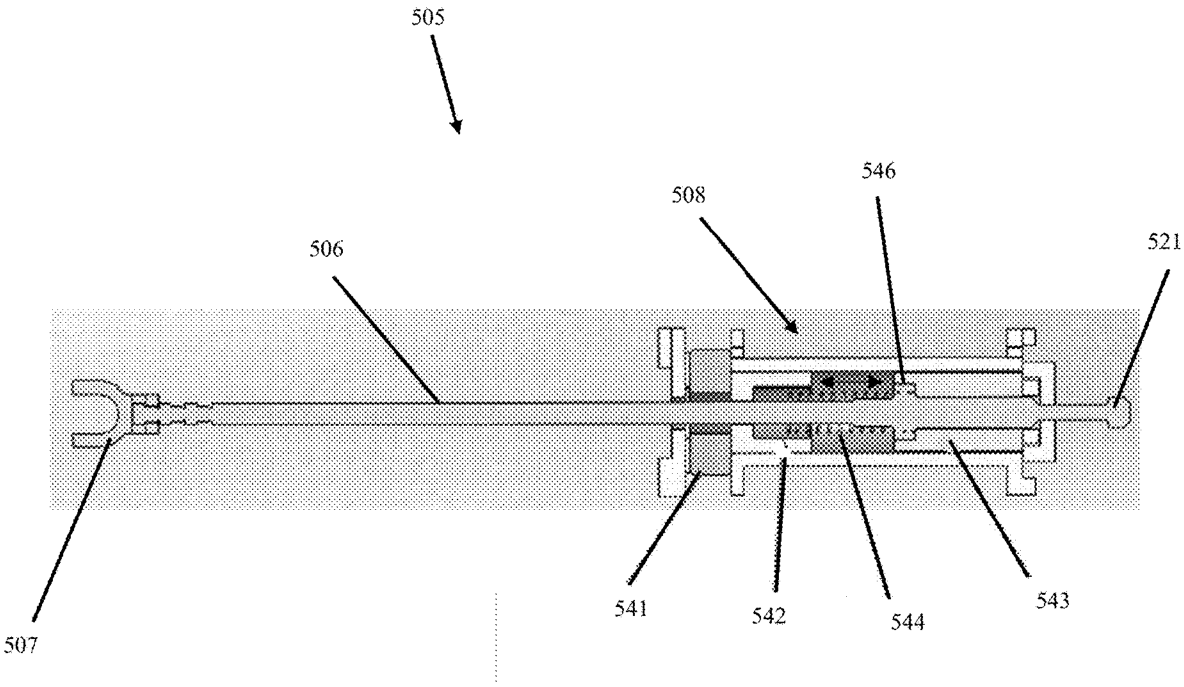
FIG. 9 is a cross-sectional view of the latching solenoid of FIG. 7.

The latching solenoid 505 is configured to be toggled between a latched configuration in which the plunger 506 is in the extended configuration (see, e.g., FIGS. 5-6) and an unlatched configuration in which the plunger 506 is in the retracted configuration (see, e.g., FIGS. 3-4 and 9). A wireless communication circuit 533 is in electrical communication (e.g., via wired connection 520) with the latching solenoid 505 and/or the processor 531. The wireless communication circuit 533 is configured to receive a wireless signal from a remote entity to cause the latching solenoid 505 to toggle between the latched configuration and the unlatched configuration. Thus, a user may remotely operate the circuit breaker 500 to turn the circuit breaker 500 on and off without physically contacting the circuit breaker 500.

In an aspect of the present disclosure, a contact arm 515 is supported at the distal end portion 512 of the lever arm 502. The second contact 504 is disposed on the contact arm 515 to face the first contact 503 supported by the housing 501.

In an aspect of the present disclosure, a coupling arm 507 is supported at a distal end 522 of the plunger 506. The coupling arm 507 is operably coupled to the proximal end portion 511 of the lever arm 502. As an example, the coupling arm 507 may have a semi-circular shape, such as a "C" shape.

Figure 7:
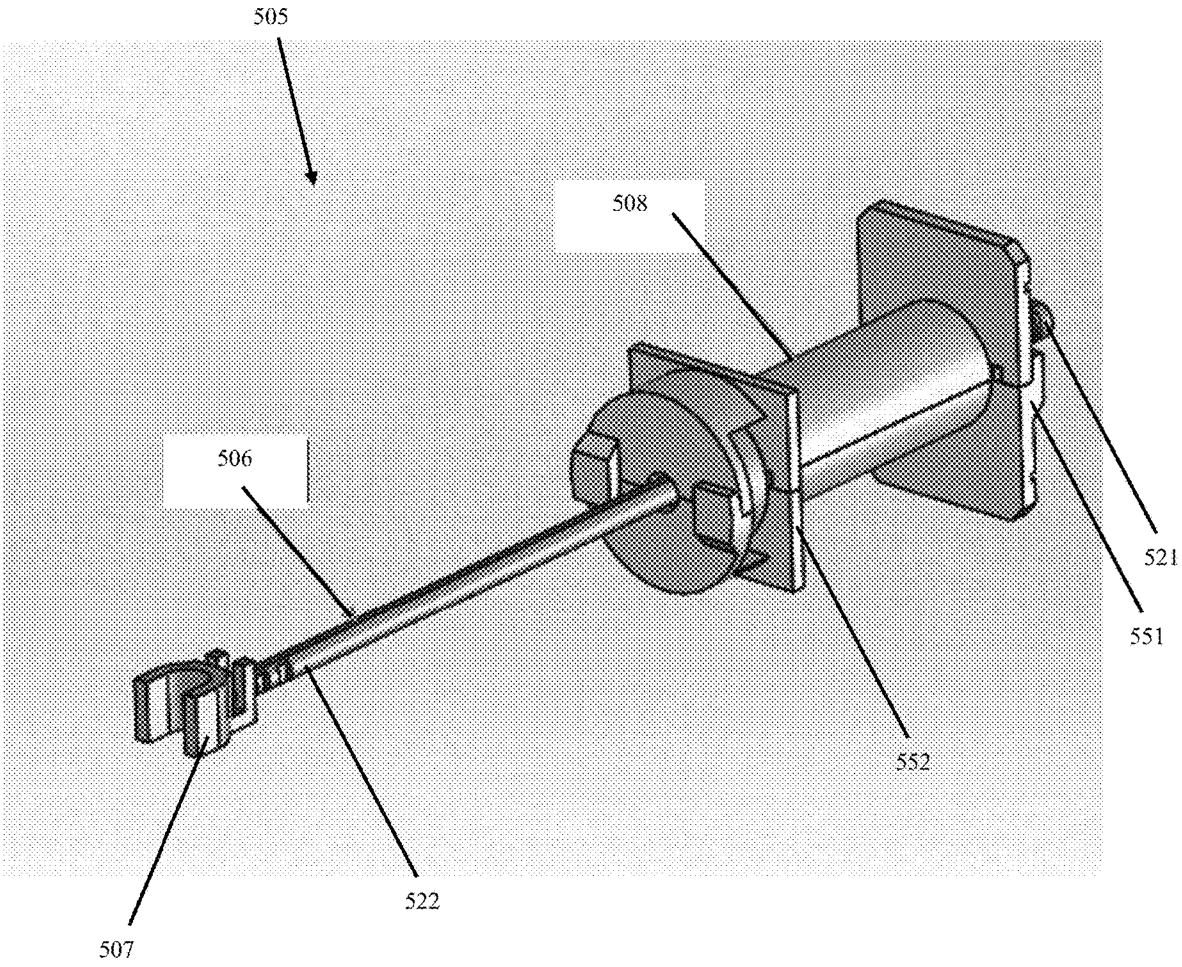
FIG. 7 is a perspective view of a latching solenoid in accordance with aspects of the present disclosure.
Figure 8:
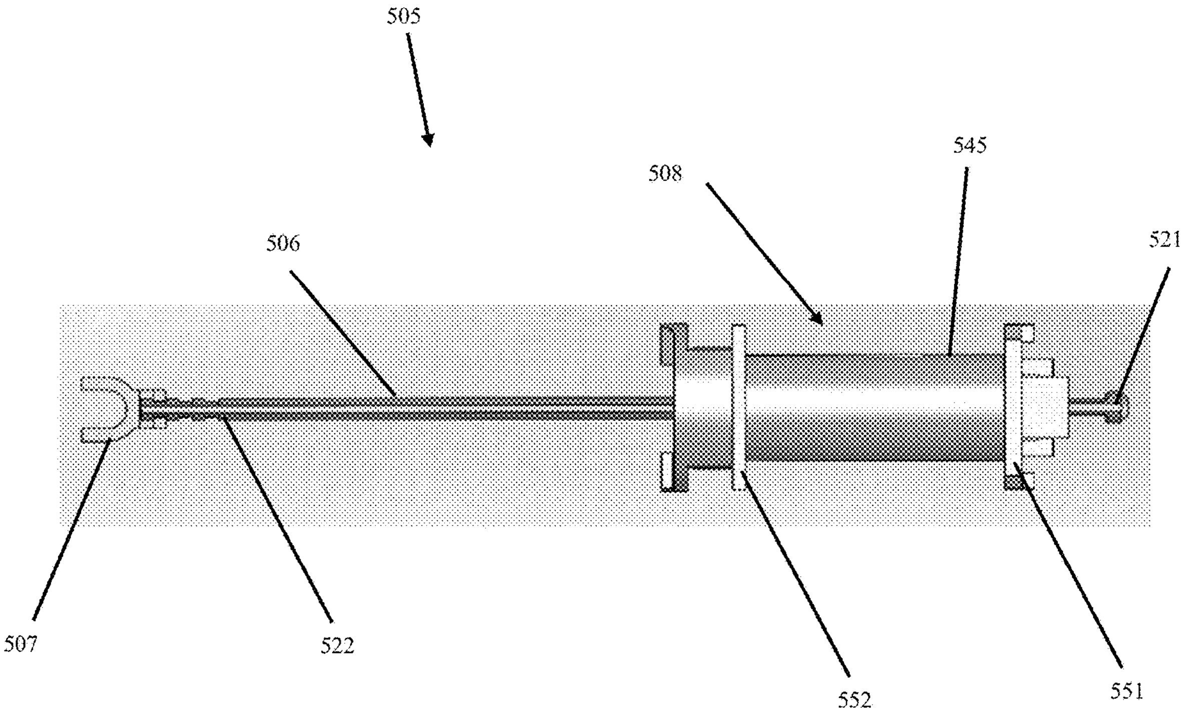
FIG. 8 is a top plan view of the latching solenoid of FIG. 7.

Referring particularly to FIGS. 7-9, the latching solenoid 505 includes a bobbin 508 defining a proximal end 551 and a distal end 552. The plunger 506 extends distally from the distal end 552 of the bobbin 508. The plunger 506 includes a proximal end portion extendable through an interior space of the bobbin 508. The 506 plunger is longitudinally translatable withing the bobbin 508 to be moved between the latched and unlatched states descried herein.

The bobbin 508 includes a magnet 541 (e.g., a permanent magnet), a pole piece 542 extending from the magnet 541, and a core 543 operably coupled to the plunger 506. The core 543 is slidably disposed in the bobbin 508 to longitudinally translate the plunger 506. The core 543 is configured to slide between a latched configuration in which the core 543 is in contact with the pole piece 542 and the circuit breaker 500 is in the OFF state and an unlatched configuration in which the core 543 is spaced apart from the pole piece 542 and the circuit breaker 500 is in the ON state.

In an aspect of the present disclosure, the plunger 506 includes a projection 546 extending therefrom for coupling the plunger 506 to the core 543. The plunger 506 may have a cylindrical shape in which the projection 546 extends from the plunger 506 circumferentially.

In an aspect of the present disclosure, a biasing member 544 (e.g., a spring) extends between the core 543 and the pole piece 542. The biasing member 544 biases the core 543 toward the unlatched configuration in which the core 543 is spaced apart from the pole piece 542.

In an aspect of the present disclosure, an electrical current is passed through a coil 545 in a first direction to generate a magnetic field in the core 543. An electrical current is passed through the coil 545 in a second direction opposite the first direction to reverse the magnetic field in the core 543 (e.g., the opposite polarity is delivered to the core 543). In order to achieve this, a controllably conductive switch (e.g., a triac) is used to deliver only one polarity of the AC waveform to the coil 545. Depending on the magnetic field of the core 543, the magnet 541 will either attract or repel the core 543. The bobbin 508 may be a molded plastic assembly that mechanically separates wires of the coil 545 from the core 543.

In use, when current is passed though the coil 545 the core 543 will move to a centroidal position of the latching solenoid 505 from its initial position. As the core 543 approaches the centroid, it will be in range of the magnetic field of the pole piece 542/magnet 541 which will further move the core 543 within the bobbin 508 ultimately magnetically latching it to the magnet 541 through the pole piece 542. As the core 543 moves it will translate the plunger 506 which will interact with the lever arm 502 supporting the second contact 504 of the circuit breaker 500. This linear action of the latching solenoid 505 will open the contact between the first and second contacts 503 and 504 and sever the current path turning off the circuit breaker 500. At this position, no current is required to maintain this latched position as the magnetic field of the magnet 541 will hold the core 543 in place. To return to the initial position, current is passed through the coil 545 in the reverse direction which will reverse the magnetic field of the core 543 and cause it to be repelled by the magnet 541. The assistance of biasing member 544 helps return the core 543 to its initial position. The main contact spring 588 provides the primary assistance to return the core 543 to its initial position by applying a force to the contact arm 515 and therefore to the lever arm 502. The lever arm 502, in turn, acts on the plunger 506 which returns the core 543 to its initial position. As the core 543 returns to the initial position, the plunger 506 will retract. The main spring of the circuit breaker 500 will close the contact, restoring the current path of circuit breaker 500. In the initial position, no current is required for the latching solenoid 505 to maintain this position as the core 543 can be held in place by the biasing member 544 within the latching solenoid 505. The breaker 505 remains trip free (i.e., is able to trip) at all times in both the ON and OFF positions.

In an aspect of the present disclosure, a controller 530 includes a processor 531 and a memory 532. The controller 530 is in electrical communication with the latching solenoid 505 (e.g., via wired connection 520). The wireless communication circuit 533 may be housed in the controller 530. The controller 530 is configured to control the latching solenoid 505 to toggle between the latched configuration and the unlatched configuration.

The wireless communication circuit 533 is configured to wirelessly connect to an electronic device 550 via a personal area network (PAN, Bluetooth®), wireless local area network (WiFi®) or cellular network connection. The electronic device 550 is configured to deliver a wireless signal from a remote entity indicating that the latching solenoid 505 should be toggled to the latched configuration or the unlatched configuration. The electronic device 550 may be a smartphone, a tablet computer, a laptop computer, or a desktop computer. When the remote OFF is activated, the application that interacts with the circuit breaker 500 via wireless will indicate if the circuit breaker 500 is in the OFF state in the application's GIU. An LED or similar indicator on the breaker housing 501 will illuminate to indicate the circuit breaker 500 is in the remote OFF state.

In an aspect of the present disclosure, the circuit breaker 500 may be a thermal breaker such as a single pole thermal breaker or a two-pole thermal breaker.

Reset assemblies for circuit breakers are described below. Unless otherwise indicated below, the components of the circuit breakers described below with reference to FIGS. 10A-13B are substantially the same as the circuit breaker 500 described above. The reset assemblies described below can be employed in the circuit breaker 500 described above.

Referring generally to FIGS. 3-6 and 11A-11B, an electrical reset assembly 1101 for resetting a circuit breaker 1100 is described. After the circuit breaker 1100 is in the remotely triggered OFF state (e.g., by the action of the latching solenoid 1105), the rocker 1080 remains in an "on/reset" position and the plunger 1006 of the latching solenoid 1105 will be in the extended configuration. If a user is then at the breaker panel and wishes to reset the breaker via the rocker 1080, the plunger 1006 of the latching solenoid 1105 needs to be moved to a retracted configuration. To do this, when the rocker 1080 of the circuit breaker 1100 is then moved to the off position, the electrical reset assembly 1101 is used to toggle the remote on/off latching solenoid 1105 to its retracted position. The electrical reset assembly 1101 may include an electrical switch 1102 and an indicator 1103 (e.g., an LED light or other visual indicator visible from an exterior of the circuit breaker 1100) to provide an external signal that the circuit breaker 1100 is in a remotely triggered OFF state. The electrical reset assembly 1101 moves a plunger 1006 of a latching solenoid 1105 from an extended configuration to the retracted configuration by passing an electrical current through the latching solenoid 1105. The electrical reset assembly 1101 may also be used to reset the breaker via the rocker after being put in the remotely triggered OFF state upon restoration after a power loss or after a re-installation of the breaker (e.g. the breaker being removed from a panel and reinstalled or put in another panel after being put in the remotely triggered OFF state).

As an example, this can be done with the electrical switch 1102 that when triggered will cause an electrical current to be passed through the latching solenoid 1105 in the reverse direction (e.g., reverse of the latching current).

According to an aspect the present disclosure, the electrical switch 1102 can be a manual button on circuit breaker 1100 that can be pressed to reset the latching solenoid 1105. The electrical switch 1102 can be incorporated into the stroke of the rocker 1080 so that as the rocker 1080 is switched to the "off" position a signal is sent to send a reverse current through the on/off latching solenoid 1105 to reset it. This will bring the latching solenoid 1105 to the initial position and the circuit breaker 1100 can then be turned on and off with the rocker 1080 as normal. If the circuit breaker 1100 is turned back to the "on/reset" state, the circuit breaker 1100 will be on and current will be flowing through it until the circuit breaker 1100 is turned off remotely or the rocker 1080 is switched to the off position.

Referring to FIGS. 10A-13B, a mechanical reset assembly 1000 for resetting circuit breaker 1100 is described. The mechanical reset assembly 1000 can be used as an alternative to the electrical reset assembly 1101. Similarly to the electrical reset assembly 1101, the mechanical reset assembly 1000 is configured to move the plunger 1006 of the latching solenoid 1105 from the extended configuration to the retracted configuration by applying a mechanical force to the plunger 1006 by the rocker 1080.

Figure 10A:
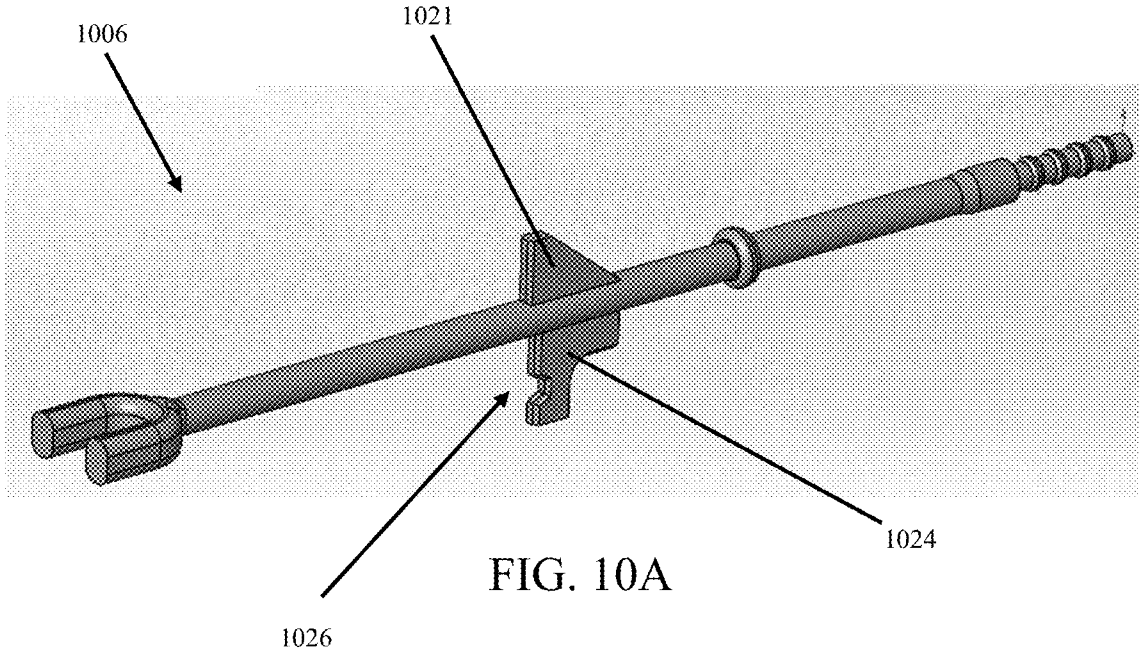
FIG. 10A is a perspective view of a plunger in accordance with aspects of the present disclosure.

The plunger 1006 includes a reset blade 1021 defined by the plunger 1006 (see, e.g., FIG. 10A). A reset notch 1022 is defined in the rocker 1080 (see, e.g., FIG. 10B). The reset notch 1022 is configured to mechanically interact with the reset blade 1021 to move the plunger 1006 from the extended configuration to the retracted configuration by mechanical force applied by the rocker 1080 as it is moved from the on to the off position. As an example, the reset notch 1022 may define a V-shape.

Figure 10B:
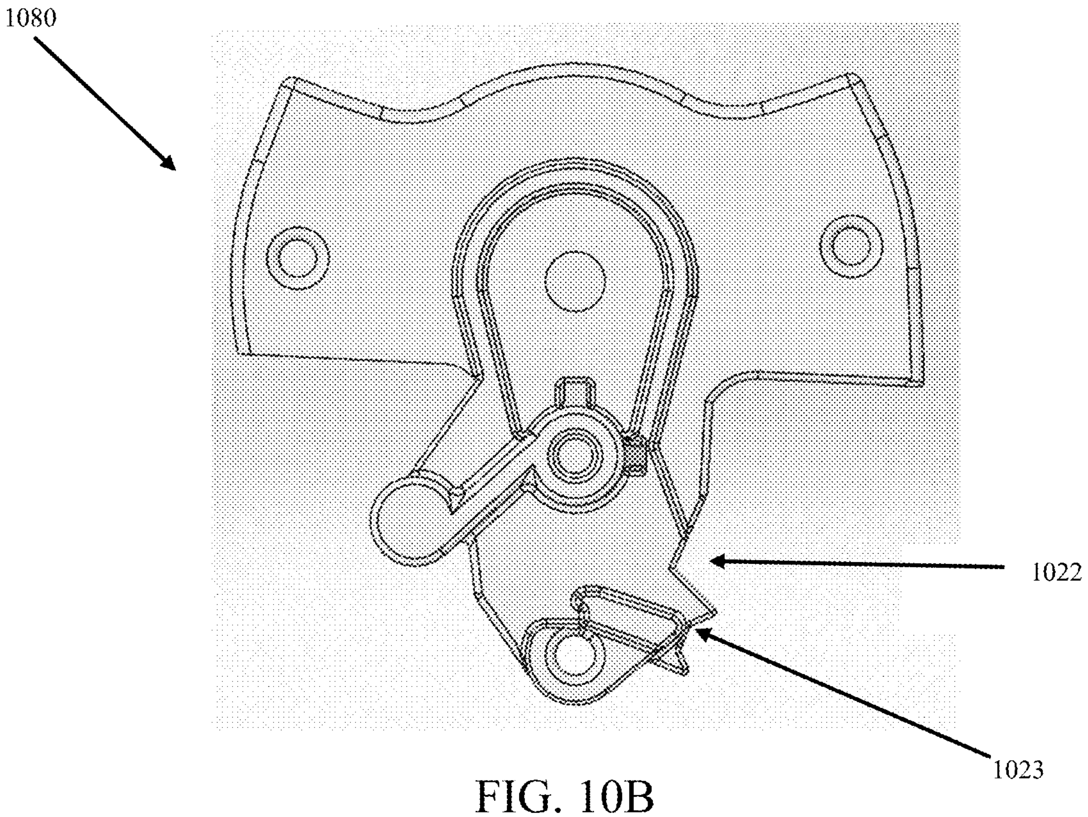
FIG. 10B is a side view of a rocker configured to engage the plunger of FIG. 10A.
Figure 11A:
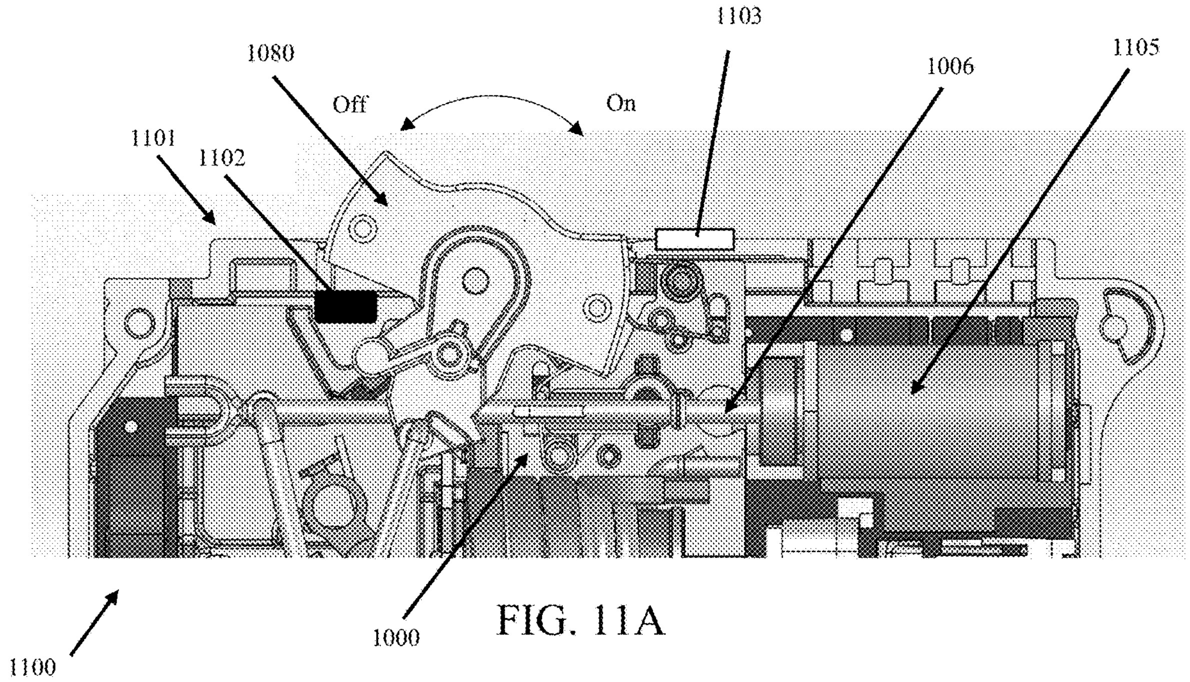
FIG. 11A is a side view showing internal components of a circuit breaker including the plunger of FIG. 10A and the rocker of FIG. 10B.
Figure 11B:
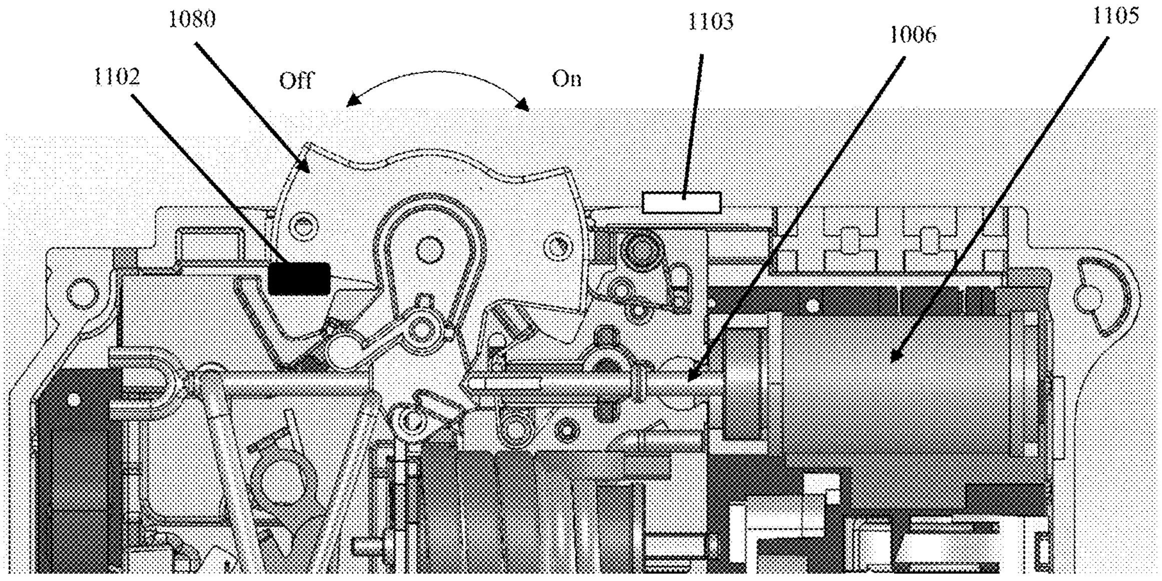
FIG. 11B is a side view of the circuit breaker of FIG. 11A with the rocker being moved to an off position to reset the plunger.

In an aspect of the present disclosure, the rocker 1080 defines a stop notch 1023 (see, e.g., FIG. 10B). The stop notch 1023 is configured to engage the reset blade 1021 when the rocker 1080 is an the off state to prevent the plunger 1006 from moving from the retracted configuration to the extended configuration by remote triggering.

The plunger 1006 includes a stabilization blade 1024 defined by the plunger 1006. The stabilization blade 1024 is configured to engage a groove 1025 (see, e.g., FIG. 13A) of the circuit breaker 1100 to guide a longitudinal path and prevent unwanted rotation of the plunger 1006. The reset blade 1021 may extend from the plunger 1006 in substantially an opposite direction with respect to the stabilization blade 1024.

Figure 12A:
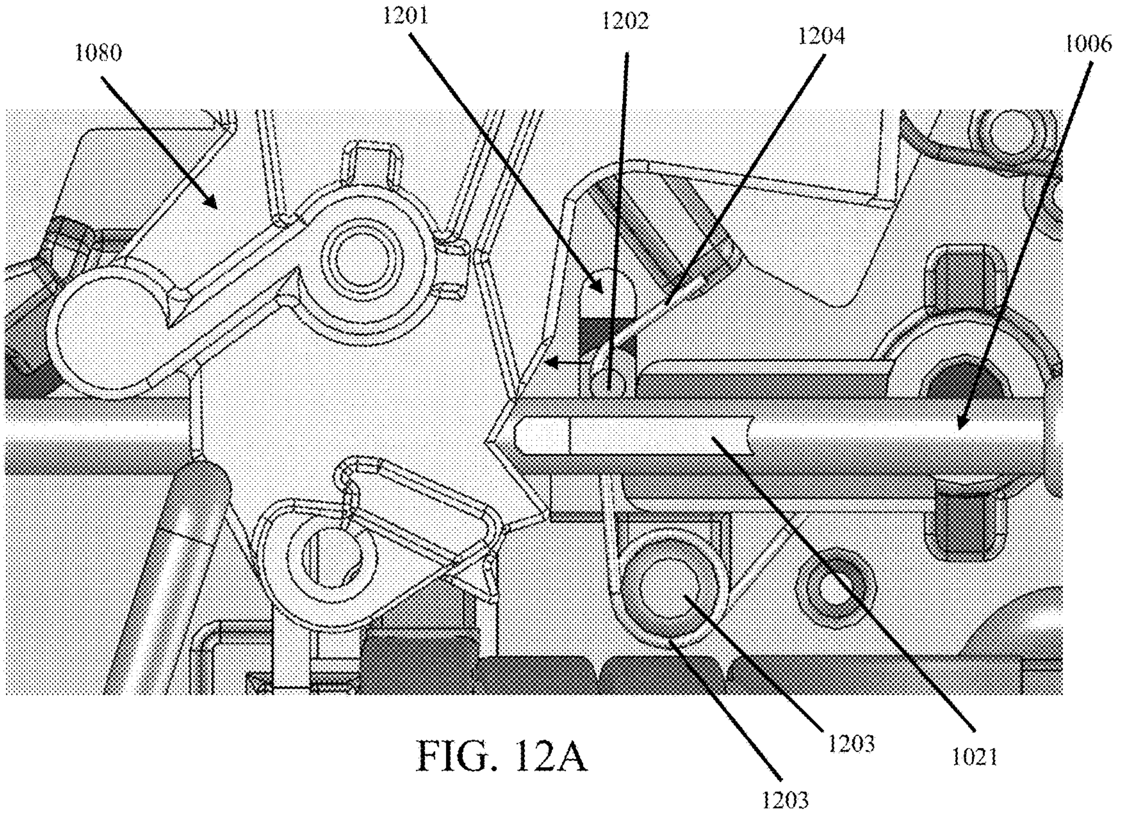
FIG. 12A is an enlarged side view of the circuit breaker of FIG. 11B illustrating an indicator switch.
Figure 12B:
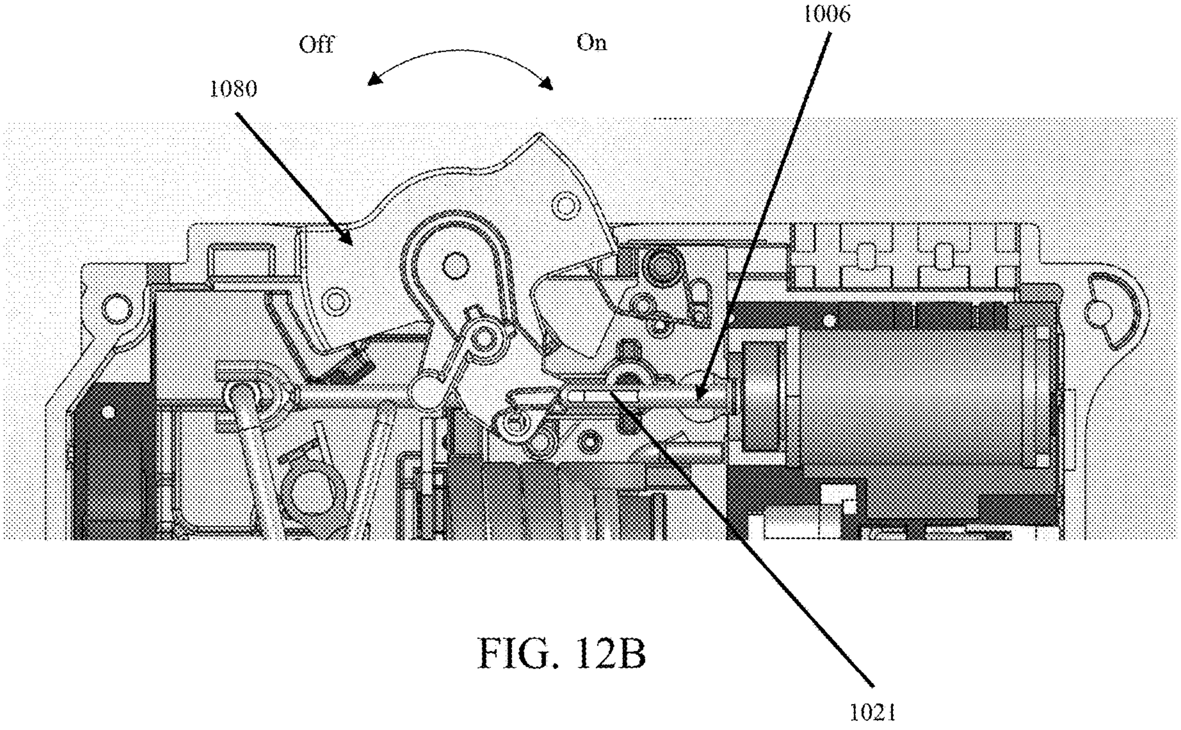
FIG. 12B is an enlarged side view of the breaker of FIG. 11A with the rocker in an off position and a stop notch of the rocker aligned with the plunger to mechanically prevent the plunger from being moved to a latched configuration.
Figure 13A:
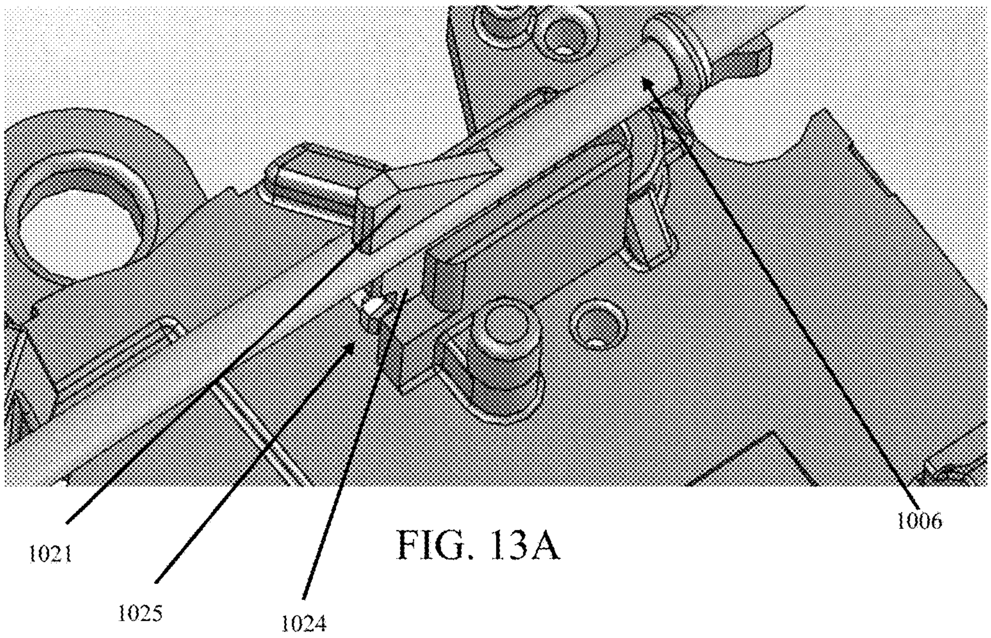
FIG. 13A is an enlarged, perspective view of the plunger of FIG. 10A.
Figure 13B:
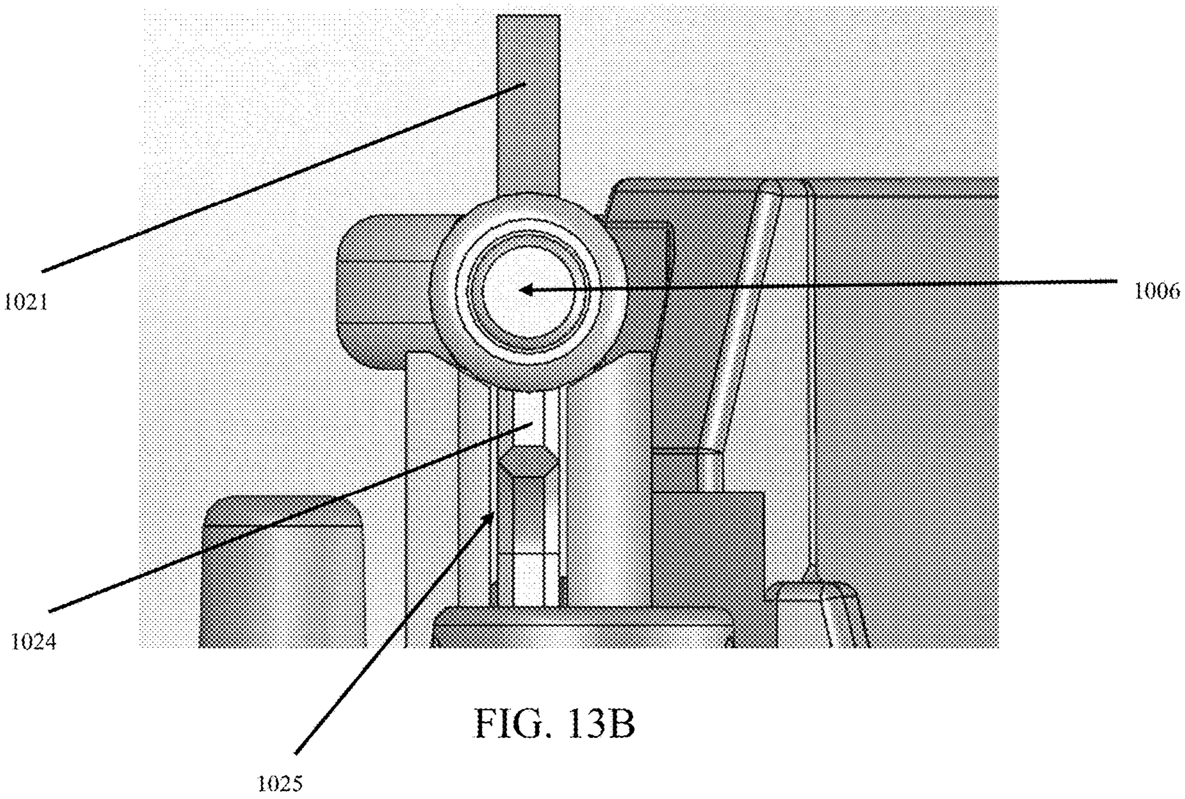
FIG. 13B is an enlarged, cross-sectional view of the plunger of FIG. 10A.
Figure 14:
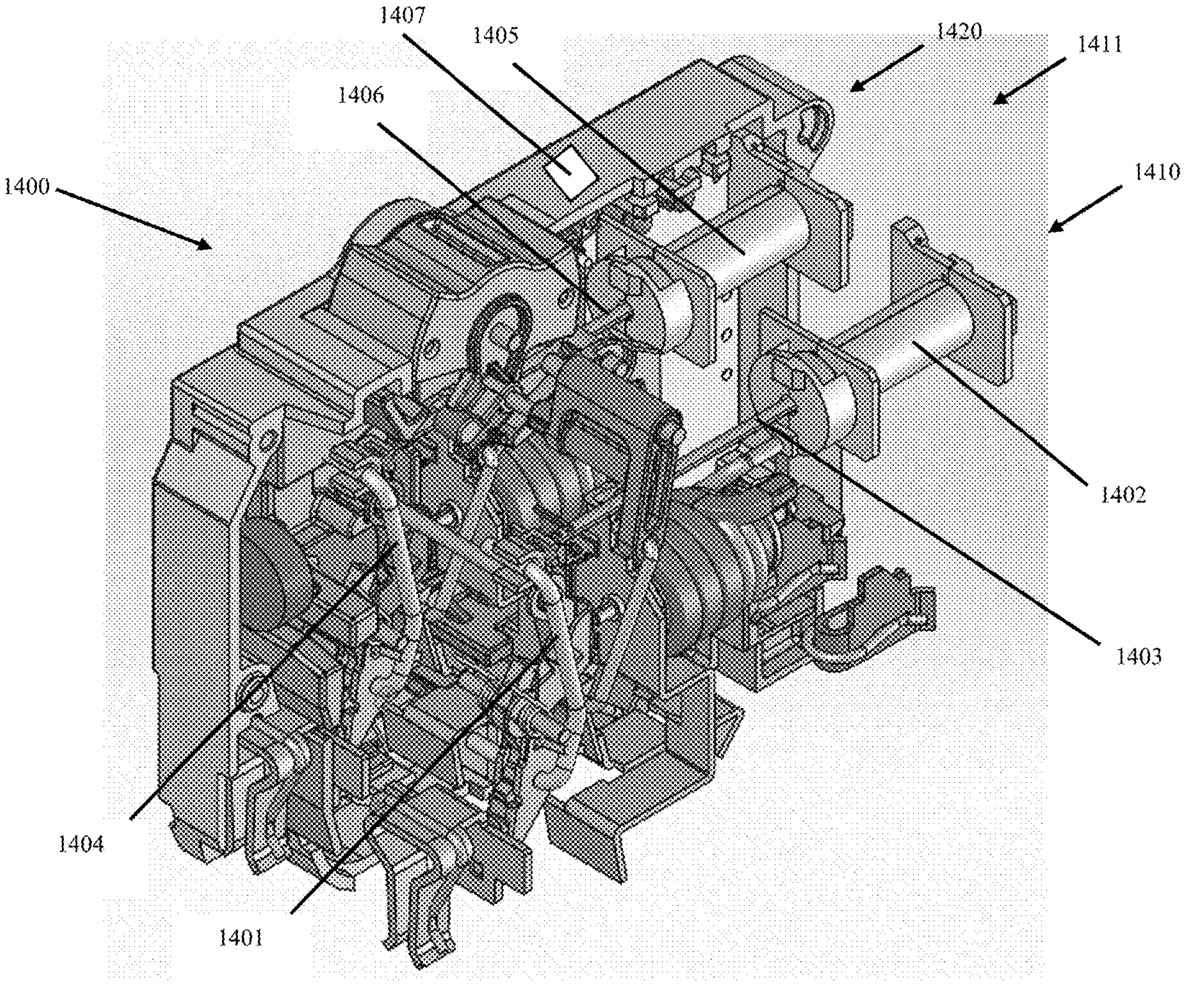
FIG. 14 is a front perspective view of a two-pole breaker in accordance with aspects of the present disclosure.
Figure 15:
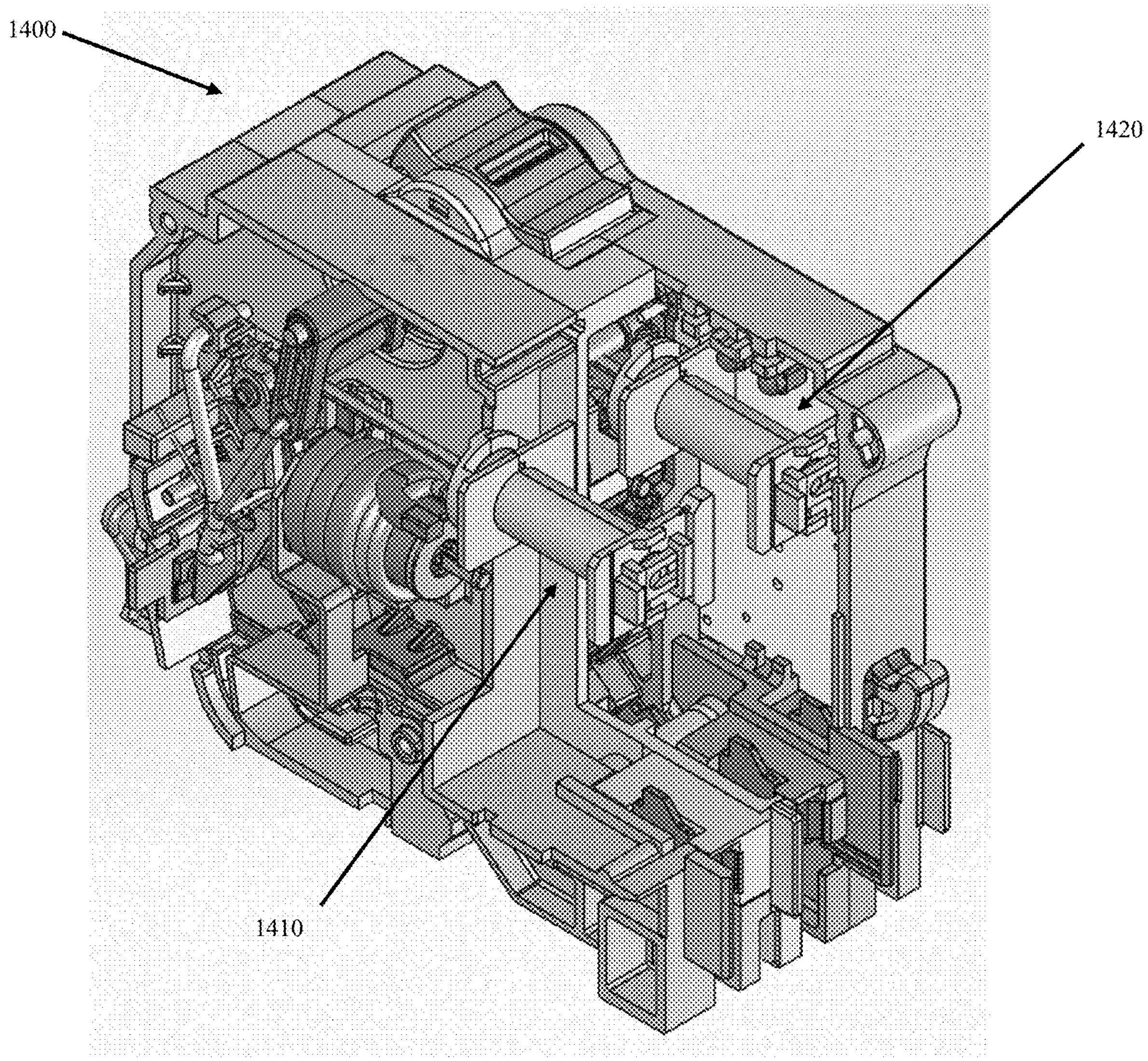
FIG. 15 is a rear perspective view of the two-pole breaker of FIG. 14.
Figure 16:
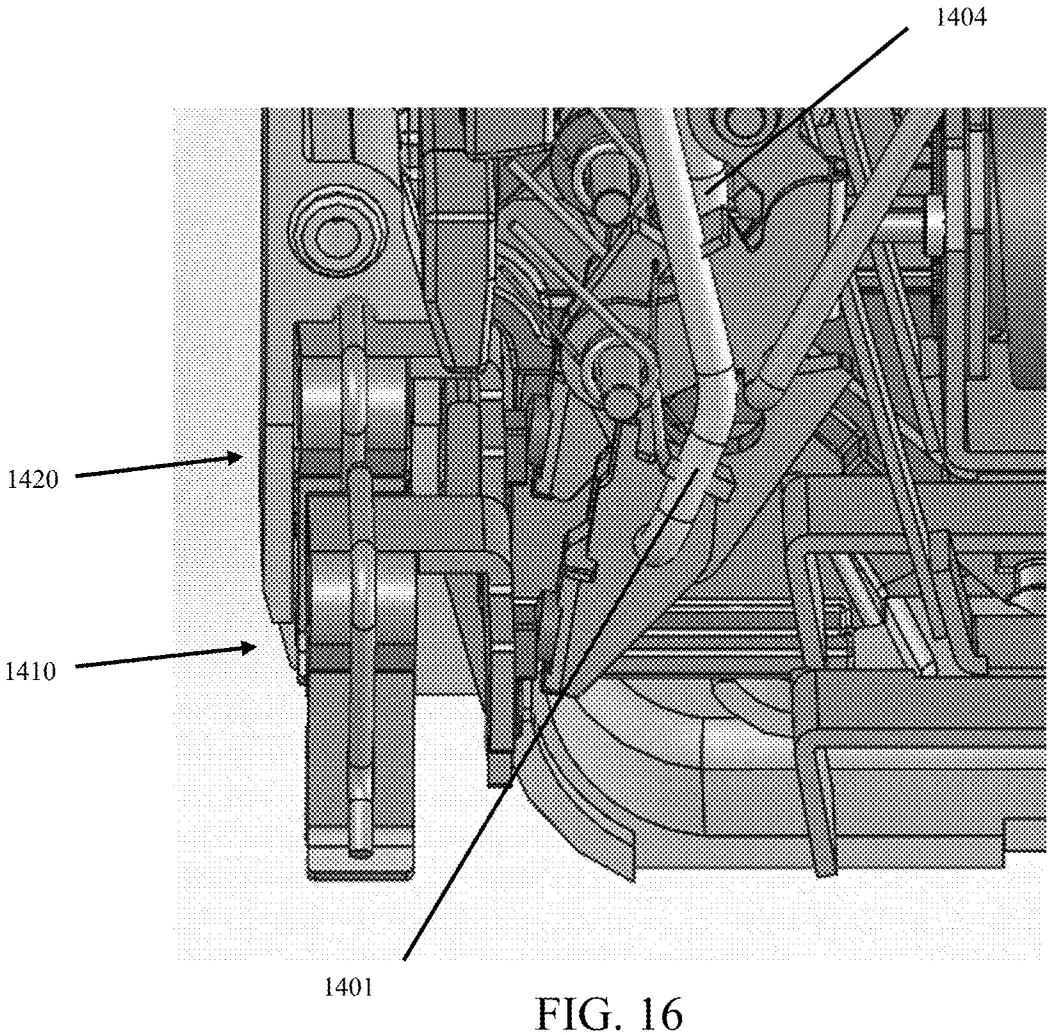
FIG. 16 is an enlarged side view of a first lever arm of a first pole and a second lever arm of a second pole of the two-pole breaker of FIG. 14 with the two-pole breaker in an ON state.

Referring particularly to FIG. 12A, an indicator switch 1201 is supported in the housing (see, e.g., housing 501). The plunger 1006 defines a notch 1026 in stabilization blade 1024 (see, e.g., FIG. 10A) configured to engage the indicator switch 1201 when the plunger 1006 is in the extended configuration. Engaging the indicator switch 1201 by the plunger 1006 activates an indicator (e.g., indicator 1103 in FIG. 11B) communicating that the circuit breaker 1100 is in the remote OFF state. The indicator switch 1201 includes a pin 1202 (e.g., a fixed pin) and a spring 1203 (e.g., a torsion spring) supported in the housing. The spring 1203 may be supported by a support post 1205 supported by the housing. The spring 1203 includes an arm 1204 biased toward the pin 1202. The arm 1204 of the spring 1203 is in contact with the pin 1202 when the plunger 1006 is in the retracted configuration. The arm 1204 of the spring 1203 is separated from the pin 1202 (see directional arrow in FIG. 12A) by engaging and applying mechanical pressure to the arm 1204 of the spring 1203 by the notch 1026 of the plunger 1006 when the plunger 1006 is moved to the extended configuration.

As an example, when the circuit breaker 1100 is in the remotely triggered OFF state (e.g., by the action of the latching solenoid 1105), the rocker 1080 remains in an "on/reset" position and the plunger 1006 of the latching solenoid 1105 will be in the extended position. When the circuit breaker 1100 is turned off by way of the rocker 1080 the remote on/off latching solenoid 1105 can be reset to its initial position by the rocker 1080. This can be done via the mechanical interaction between the reset notch 1022 of the rocker 1080 and the reset blade 1021 of the plunger 1006. As the rocker 1080 is moved from the on/reset position to the off position, the interior portion of the rocker 1080 will swing around in a circular path and the reset notch 1022 (e.g., a V shaped notch) will strike the reset blade 1021 on the plunger 1006. The shape of reset notch 1022 orientates the reset blade 1021 so that it is properly aligned as the rocker 1080 exerts force on it. This will overcome the force of the permanent magnet (see, magnet 541) within the latching solenoid 1105 and the plunger 1006 will be returned to its initial position by the internal spring (e.g., spring 544) within the latching solenoid 1105. Because the path of travel of the rocker 1080 is that of an arc and the path of travel of the plunger 1006 is linear, the rocker 1080 can exert addition forces on the plunger 1006 which can cause it to become twisted and misaligned. To solve this issue, an additional blade (e.g., stabilization blade 1024) is molded into the plunger 1006 opposite of the reset blade 1021. The stabilization blade 1024 rides in a groove 1025 supported in the housing and aids in keeping the plunger 1006 aligned as it is struck and moved by the rocker 1080.

When the circuit breaker 1100 is in the off state via the rocker 1080, the latching solenoid 1105 may be mechanically prevented from latching to its remote off position in the event that current is sent to it. This is done with the stop notch 1023 (e.g., a V shaped notch) which mechanically blocks the reset blade 1021 on the plunger 1006 of the latching solenoid 1005 from moving to its extended position as a result of receiving a remote signal. When the rocker 1080 is moved to the on/reset position, the stop notch 1023 is removed from the path of the plunger 1006 allowing the plunger 1006 to move to the extended position as a result of receiving a remote signal.

Referring to FIGS. 14-17, a 2-pole circuit breaker 1400 is described. Unless otherwise indicated below, each side/pole of the two-pole circuit breaker 1400 is substantially the same as one of the circuit breakers described above.

Figure 17:
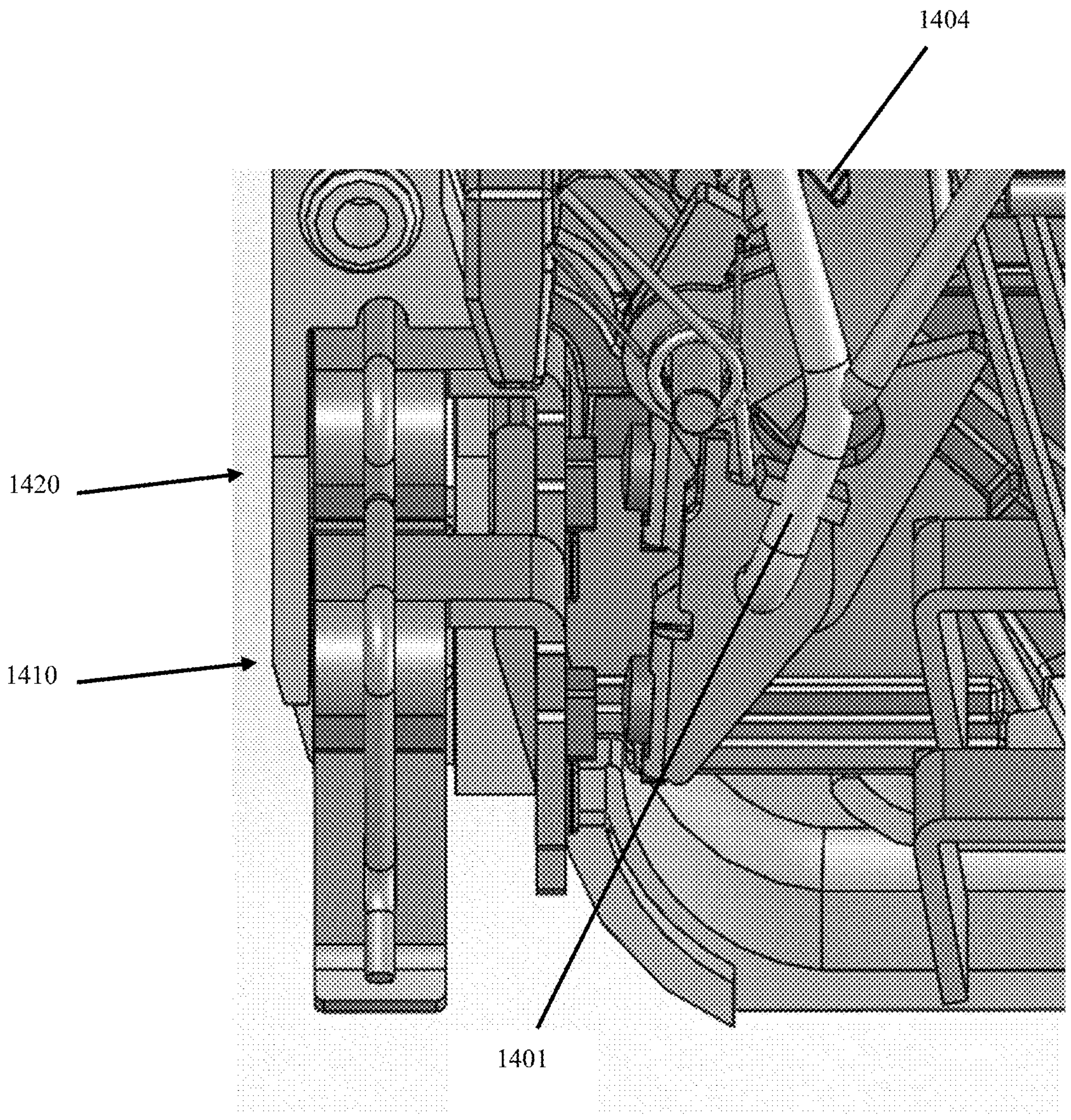
FIG. 17 is an enlarged side view of the first lever arm of the first pole and the second lever arm of the second pole of the two-pole breaker of FIG. 14 with the two-pole breaker in an OFF state.

An assembly 1411 for remotely operating the two-pole circuit breaker 1400 includes a first lever arm 1401 configured to be remotely pivoted between a first position in which a first breaker pole 1410 is in an ON state (see, e.g., FIG. 16) and a second position to toggle the first breaker pole 1410 to an OFF state (see, e.g., FIG. 17). A first latching solenoid 1402 includes a first plunger 1403 operably coupled to the first lever arm 1401. The first latching solenoid 1402 is configured to move the first plunger 1403 between a retracted configuration (see, e.g., FIG. 16) and an extended configuration (see, e.g., FIG. 17) in which the first lever arm 1401 is pivoted by the first plunger 1403 to bring the first lever arm 1401 from the first position to the second position. A second lever arm 1404 is configured to be remotely pivoted between a first position in which a second breaker pole 1420 is in an ON state (see, e.g., FIG. 16) and a second position to toggle the second breaker pole 1420 to an OFF state (see, e.g., FIG. 17). A second latching solenoid 1405 includes a second plunger 1406 operably coupled to the second lever arm 1404. The second latching solenoid 1405 is configured to move the second plunger 1406 between a retracted configuration (see, e.g., FIG. 16) and an extended configuration (see, e.g., FIG. 17) in which the second lever arm 1404 is pivoted by the second plunger 1406 to bring the second lever arm 1404 from the first position to the second position.

In an aspect of the present disclosure, the first latching solenoid 1402 is arranged in-parallel with the second latching solenoid 1405.

In an aspect of the present disclosure, the first plunger 1403 of the first latching solenoid 1402 is configured to be moved between the retracted configuration and the extended configuration substantially simultaneously with the second plunger 1406 of the second latching solenoid 1405 being moved between the retracted configuration and the extended configuration.

The position of the solenoids 1402 and 1405 (and therefore the remote on/off state of circuit breaker 1400) will be at least partly determined by a switch (see, e.g., electrical switch 1102 or indicator switch 1201). Either of switches 1102 and/or 1201 may be incorporated into circuit breaker 1400 and may communicate a remote on/off state of the circuit breaker 1400 via indicator (e.g., LED light) 1407. As an example, the indicator 1407 indicates a remote on/off state of each of poles 1410 and 1420 of the circuit breaker 1400 based on a signal received from at least one of switches 1102 or 1201. As an example, each of poles 1410 and 1420 may include its own indicator switch 1201 in electrical communication with indicator 1407. Thus, the remote on/off status of a single pole of the two-pole circuit breaker 1400 can be used to indicate the remote on/off status of each of poles 1410 and 1420 (e.g., via indicator 1407).

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

The invention claimed is:

1. A remotely operated circuit breaker, comprising:

a housing;

a first circuit interrupter supported in the housing, the first circuit interrupter configured to be switched between a closed configuration in which the first circuit interrupter is in an ON state and an open configuration in which the first circuit interrupter is in an OFF state, wherein the first circuit interrupter is switched to the open configuration when a predetermined condition is detected by the first circuit interrupter;

a main contact spring supported in the housing;

a lever arm pivotably coupled to the main contact spring, the lever arm defining a proximal end portion and a distal end portion;

a first contact supported by the housing;

a second contact supported at the distal end portion of the lever arm, wherein pivoting of the lever arm to bring the second contact into contact with the first contact causes the first circuit interrupter to enter the ON state, and wherein pivoting of the lever arm to separate the second contact from the first contact causes the first circuit interrupter to enter the OFF state;

a second circuit interrupter including a plunger operably coupled to the proximal end portion of the lever arm, the second circuit interrupter configured to move the plunger between a retracted configuration and an extended configuration, wherein when in the extended configuration the lever arm is pivoted by the plunger to separate the second contact from the first contact to cause the first circuit interrupter to enter the OFF state;

a communication circuit in electrical communication with the second circuit interrupter, the communication circuit configured to receive a communication signal from a remote entity, wherein upon receiving the communication signal, the communication circuit causes the second circuit interrupter to move the plunger between a retracted configuration and an extended configuration;

a rocker configured to transition the first circuit interrupter between the ON state and the OFF state; and a mechanical reset assembly, the mechanical reset assembly configured to move the plunger of the second circuit interrupter from the extended configuration to the retracted configuration, the movement of the plunger caused by applying a mechanical force to the plunger by the rocker, wherein the mechanical reset assembly further includes a reset blade defined by the plunger of the second circuit interrupter and a reset notch defined in the rocker, the reset notch configured to mechanically interact with the reset blade to move the plunger from the extended configuration to the retracted configuration.

2. The circuit breaker of claim 1, wherein the second circuit interrupter is a latching solenoid, an electrically-held relay, or a solid state relay.

3. The circuit breaker of claim 1, further including a controller in electrical communication with the second circuit interrupter, wherein the communication circuit is in electrical communication with the second circuit interrupter via the controller, and wherein the controller is configured to control the second circuit interrupter to toggle the plunger between the retracted configuration and the extended configuration.

4. The circuit breaker of claim 1, wherein the first circuit interrupter is a thermal breaker, a thermal-magnetic breaker, a hydraulic-magnetic breaker, a magnetic breaker, or a hydraulic breaker.

5. The circuit breaker of claim 1, wherein the first circuit interrupter is a two-pole breaker or a three-pole breaker.

6. The circuit breaker of claim 1, further including a contact arm supported at the distal end portion of the lever arm, wherein the second contact is disposed on the contact arm to face the first contact supported by the housing.

7. The circuit breaker of claim 1, further including a coupling arm supported at a distal end of the plunger, wherein the coupling arm is operably coupled to the proximal end portion of the lever arm.

8. The circuit breaker of claim 1, wherein the mechanical reset assembly further includes a stop notch defined in the rocker, the stop notch configured to engage the reset blade to prevent the plunger from moving from the retracted configuration to the extended configuration.

9. The circuit breaker of claim 1, wherein the mechanical reset assembly further includes a stabilization blade defined by the plunger, the stabilization blade configured to engage a groove of the circuit breaker to guide a longitudinal path of the plunger.

10. The circuit breaker of claim 1, wherein the second circuit interrupter is configured to be toggled between a latched configuration in which the plunger is in the extended configuration and an unlatched configuration in which the plunger is in the retracted configuration.

11. The circuit breaker of claim 1, wherein the communication circuit includes an ethernet port and wherein the communication signal is received via the ethernet port.

12. The circuit breaker of claim 1, further including:

an electrical reset assembly coupled to the rocker, the electrical reset assembly configured to energize a latching solenoid to cause the plunger to move from the extended configuration to the retracted configuration by passing an electrical current through the latching solenoid.

13. The circuit breaker of claim 1, wherein the communication circuit is a wireless communication circuit and wherein the communication signal is a wireless communication signal.

14. The circuit breaker of claim 13, wherein the wireless communication circuit is configured to wirelessly connect to an electronic device via one or more of a personal area network, a wireless local area network, or a cellular network connection, and wherein the electronic device is configured to deliver a wireless signal instruction that the second circuit interrupter is to be toggled to the latched configuration or the unlatched configuration.

15. The circuit breaker of claim 1, further including an indicator switch supported in the housing, wherein the plunger defines a notch configured to engage the indicator switch when the plunger is in the extended configuration, and wherein engaging the indicator switch by the plunger activates an indicator communicating that the first circuit interrupter is in the OFF state.

16. The circuit breaker of claim 15, wherein the indicator switch includes a pin and a spring supported in the housing, the spring including an arm biased toward the pin, wherein the arm of the spring is in contact with the pin when the plunger is in the retracted configuration, and wherein the arm of the spring is separated from the pin by engaging the arm of the spring in the notch of the plunger when the plunger is moved to the extended configuration.

17. The circuit breaker of claim 1, wherein the second circuit interrupter includes:

a bobbin;

a magnet;

a pole piece extending from the magnet; and a core operably coupled to the plunger, wherein the core is slidably disposed in the bobbin, wherein the core is configured to slide between:

a latched configuration in which the core is in contact with the pole piece and the first circuit interrupter is in the OFF state; and an unlatched configuration in which the core is spaced apart from the pole piece and the first circuit interrupter is in the ON state.

18. The circuit breaker of claim 17, further including a biasing member extending between the core and the pole piece, the biasing member configured to bias the core toward the unlatched configuration in which the core is spaced apart from the pole piece.

19. The circuit breaker of claim 18, further including a coil, wherein a first electrical current is passed through the coil in a first direction to generate a magnetic field in the core, and wherein a second electrical current is passed through the coil in a second direction opposite the first direction to reverse the magnetic field in the core.

20. An assembly for remotely operating a circuit breaker, comprising:

a lever arm configured to be remotely pivoted between a first position in which a circuit breaker is in an ON state and a second position to toggle the circuit breaker to an OFF state;

a latching solenoid including a plunger operably coupled to the lever arm, the latching solenoid configured to move the plunger between a retracted configuration and an extended configuration in which the lever arm is pivoted by the plunger to bring the lever arm from the first position to the second position;

a wireless communication circuit in electrical communication with the latching solenoid, the wireless communication circuit configured to receive a wireless signal from a remote entity for moving the plunger between the retracted configuration and the extended configuration;

a rocker configured to transition the circuit breaker between the ON state and the OFF state; and a mechanical reset assembly configured to move the plunger of the latching solenoid from the extended configuration to the retracted configuration, the movement of the plunger caused by applying a mechanical force to the plunger, wherein the mechanical reset assembly further includes a reset blade defined by the plunger and a reset notch defined in the rocker, the reset notch configured to mechanically interact with the reset blade to move the plunger from the extended configuration to the retracted configuration.

21. The assembly of claim 20, further including a controller in electrical communication with the latching solenoid, wherein the wireless communication circuit is housed in the controller, and wherein the controller is configured to control the latching solenoid to move the plunger between the retracted configuration and the extended configuration.

22. The assembly of claim 20, further including an electrical reset assembly, the electrical reset assembly configured to move the plunger of the latching solenoid from the extended configuration to the retracted configuration by passing an electrical current through the latching solenoid.

23. The circuit breaker of claim 20, further including an indicator switch supported in the housing, wherein the plunger defines a notch configured to engage the indicator switch when the plunger is in the extended configuration, and wherein engaging the indicator switch by the plunger activates an indicator communicating that the circuit breaker is in the OFF state.

24. The assembly of claim 20, wherein the latching solenoid includes:

a bobbin;

a magnet;

a pole piece extending from the magnet; and a core operably coupled to the plunger, wherein the core is slidably disposed in the bobbin, wherein the core is configured to slide between:

a latched configuration in which the core is in contact with the pole piece and the circuit breaker is in the OFF state; and an unlatched configuration in which the core is spaced apart from the pole piece and the circuit breaker is in the ON state.

25. The assembly of claim 24, further including a biasing member extending between the core and the pole piece, the biasing member configured to bias the core toward the unlatched configuration in which the core is spaced apart from the pole piece.

26. The assembly of claim 25, further including a coil, wherein a first electrical current is passed through the coil in a first direction to generate a magnetic field in the core, and wherein a second electrical current is passed through the coil in a second direction opposite the first direction to reverse the magnetic field in the core.

27. An assembly for remotely operating a two-pole circuit breaker, comprising:

a first lever arm configured to be remotely pivoted between a first position in which a first breaker pole is in an ON state and a second position to toggle the first breaker pole to an OFF state;

a first latching solenoid including a first plunger operably coupled to the first lever arm, the first latching solenoid configured to move the first plunger between a retracted configuration and an extended configuration in which the first lever arm is pivoted by the first plunger to bring the first lever arm from the first position to the second position;

a second lever arm configured to be remotely pivoted between a first position in which a second breaker pole is in an ON state and a second position to toggle the second breaker pole to an OFF state;

a second latching solenoid including a second plunger operably coupled to the second lever arm, the second latching solenoid configured to move the second plunger between a retracted configuration and an extended configuration in which the second lever arm is pivoted by the second plunger to bring the second lever arm from the first position to the second position;

a wireless communication circuit in electrical communication with the first and second latching solenoids, the wireless communication circuit configured to receive a wireless signal from a remote entity for moving the first and second plungers between the retracted configuration and the extended configuration;

a rocker configured to transition the circuit breaker between the ON state and the OFF state; and a mechanical reset assembly configured to move the plunger of the first latching solenoid from the extended configuration to the retracted configuration, the movement of the plunger caused by applying a mechanical force to the plunger, wherein the mechanical reset assembly further includes a reset blade defined by the plunger and a reset notch defined in the rocker, the reset notch configured to mechanically interact with the reset blade to move the plunger from the extended configuration to the retracted configuration.

28. The assembly of claim 27, wherein the first latching solenoid is arranged parallel with the second latching solenoid.

29. The assembly of claim 28 wherein the first plunger of the first latching solenoid is configured to be moved between the retracted configuration and the extended configuration substantially simultaneously with the second plunger of the second latching solenoid being moved between the retracted configuration and the extended configuration.

30. A method of remotely operating a circuit breaker, comprising:

using a first circuit interrupter to switch the circuit breaker between an ON state and an OFF state;

using the first circuit interrupter to switch the circuit breaker to the OFF state when a predetermined condition is detected;

receiving a communication signal from a remote entity;

using a second circuit interrupter to switch the circuit breaker between an ON state and an OFF state in response to the communication signal;

using a rocker to transition the first circuit interrupter between the ON state and the OFF state;

applying a mechanical force to a plunger of the second circuit interrupter by using the rocker as part of a mechanical reset assembly to move the plunger from an extended configuration to a retracted configuration; and mechanically interacting a reset notch defined in the rocker with a reset blade defined by the plunger of the second circuit interrupter to move the plunger from the extended configuration to the retracted configuration.

* * * * *